United States Patent
Murohashi et al.

(10) Patent No.: US 11,899,324 B2
(45) Date of Patent: Feb. 13, 2024

(54) ELECTRO-OPTICAL DEVICE AND DISPLAY APPARATUS

(71) Applicant: SEIKO EPSON CORPORATION, Tokyo (JP)

(72) Inventors: Tetsuaki Murohashi, Fujimi-Machi (JP); Kikuya Morita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/190,982

(22) Filed: Mar. 28, 2023

(65) Prior Publication Data
US 2023/0305346 A1  Sep. 28, 2023

(30) Foreign Application Priority Data

Mar. 28, 2022  (JP) .................................. 2022-051311

(51) Int. Cl.
*G02F 1/1362* (2006.01)
*G02F 1/1343* (2006.01)

(52) U.S. Cl.
CPC .. *G02F 1/136227* (2013.01); *G02F 1/134354* (2021.01); *G02F 1/136209* (2013.01); *G02F 1/136286* (2013.01)

(58) Field of Classification Search
None
See application file for complete search history.

(56) References Cited

U.S. PATENT DOCUMENTS

| 2017/0102596 | A1 | 4/2017 | Sugimoto |
| 2020/0075774 | A1 | 3/2020 | Sugimoto |
| 2022/0291556 | A1* | 9/2022 | Morita .............. G02F 1/136213 |

FOREIGN PATENT DOCUMENTS

| JP | 2017072741 | 4/2017 |
| JP | 2020038248 | 3/2020 |

* cited by examiner

*Primary Examiner* — Richard H Kim
(74) *Attorney, Agent, or Firm* — JCIPRNET

(57) ABSTRACT

An electro-optical device includes a substrate, a scanning line provided between a first TFT and a second TFT, common wiring, a pixel electrode, a third relay electrode including a projecting portion overlapping the scanning line in plan view and protruding from the scanning line and electrically coupling the first TFT and the pixel electrode, a capacitance element provided between the substrate and the scanning line and overlapping the second TFT in plan view, and a second relay electrode including a projecting portion overlapping the scanning line in plan view and protruding from the scanning line and electrically coupling the capacitance element and the common wiring. A contact hole electrically coupling the pixel electrode and the third relay electrode overlaps a contact hole electrically coupling the capacitance element and the second relay electrode in plan view.

8 Claims, 43 Drawing Sheets

ELECTRO-OPTICAL DEVICE AND DISPLAY APPARATUS

The present application is based on, and claims priority from JP Application Serial Number 2022-051311, filed Mar. 28, 2022, the disclosure of which is hereby incorporated by reference herein in its entirety.

BACKGROUND

1. Technical Field

The present disclosure relates to an electro-optical device and a display apparatus including the electro-optical device.

2. Related Art

JP-A-2020-38248 discloses a known configuration of an electro-optical device including a thin film transistor (hereinafter referred to as TFT) serving as a switching element for a pixel, a scanning line that is disposed between the TFT and a substrate and serves as a light shielding film for the TFT, and a holding capacitor that is disposed between the scanning line and the substrate and has a stacked structure.

One capacitance electrode of the holding capacitor in JP-A-2020-38248 also serves as a common wiring. Specifically, a first conductive layer serving as one capacitance electrode has a portion disposed in a lattice formed in a display region and a portion extended to the outer side of the display region. A common potential is supplied to the portion extended to the outer side of the display region.

Unfortunately, the configuration described in JP-A-2020-38248 has a problem in that an increase in a resistance value of the first conductive layer that is the one capacitance electrode due to the thickness, wiring dimensions, film quality, and the like of the first conductive layer leads to a higher risk of variation of the potential of the one capacitance electrode due to an influence from other signal lines, resulting in a higher risk of occurrence of defects such as unevenness in display.

Furthermore, there is a problem in that an increase in the thickness of the first conductive layer to reduce the resistance leads to an increase in the thickness of the light transmitting region, resulting in a risk of compromised transmittance.

SUMMARY

An electro-optical device according to one aspect of the present application includes a substrate, a first transistor, a second transistor adjacent to the first transistor in a first direction, a light shielding member provided along the first direction between the substrate and the first transistor and between the substrate and the second transistor, capacitance wiring, a pixel electrode provided corresponding to the first transistor, a first conductive member including a first protrusion portion overlapping the light shielding member in plan view and protruding from the light shielding member, the first conductive member electrically coupling the first transistor and the pixel electrode, a capacitance element provided between the substrate and the light shielding member and overlapping the second transistor in plan view, and a second conductive member including a second protrusion portion overlapping the light shielding member in plan view and protruding from the light shielding member, the second conductive member electrically coupling the capacitance element and the capacitance wiring. A first contact hole for electrically coupling the pixel electrode and the first conductive member overlaps a second contact hole for electrically coupling the capacitance element and the second conductive member in plan view.

An electro-optical device according to one aspect of the present application includes a substrate, a transistor, a light shielding member provided along a first direction between the substrate and the transistor, capacitance wiring, a pixel electrode provided corresponding to the transistor, a first conductive member including a first protrusion portion overlapping the light shielding member in plan view and protruding from the light shielding member, the first conductive member electrically coupling the transistor and the pixel electrode, a capacitance element provided between the substrate and the light shielding member, and a second conductive member including a second protrusion portion overlapping the light shielding member in plan view and protruding from the light shielding member, the second conductive member electrically coupling the capacitance element and the capacitance wiring. A first contact hole for electrically coupling the pixel electrode and the first conductive member overlaps a second contact hole for electrically coupling the capacitance element and the second conductive member.

A display apparatus according to one aspect of the present application includes the electro-optical device described above.

DESCRIPTION OF EXEMPLARY EMBODIMENTS

Exemplary embodiments of the present disclosure will be described below with reference to the accompanying drawings.

Note that, in each of the drawings below, to make each member a recognizable size, each of the members are illustrated to be different from an actual scale.

Note that an X-axis, a Y-axis, and a Z-axis are illustrated as necessary in the diagrams as three axes orthogonal to each other. One direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction. In addition, a plane including the X-axis and the Y-axis is also referred to as an "XY plane", viewing the XY plane in the Z1 direction or the Z2 direction is referred to as a "plan view" or "planar", and viewing a cross section including the Z-axis in the orthogonal direction is referred to as a "cross-sectional view" or "cross-sectional".

Further, in the following description regarding a substrate, for example, the term "at the substrate" refers to any of something disposed on and in contact with the substrate, something disposed at the substrate with another element such as a structure provided in between, and something disposed at the substrate with a part being in contact with the substrate and another part being disposed with another element provided in between.

In the following description, materials and thicknesses of elements used in the electro-optical device may be described, but are merely examples and should not be construed in a limiting sense unless otherwise specified.

1. First Embodiment

In the present embodiment, an active drive type liquid crystal apparatus including a TFT for each pixel will be described as an example of an electro-optical device. This liquid crystal apparatus can be used favorably as a light modulation device for a projection-type display apparatus that is a display apparatus described below, for example.

1.1 Overview of Structure of Liquid Crystal Apparatus

Figure 1:
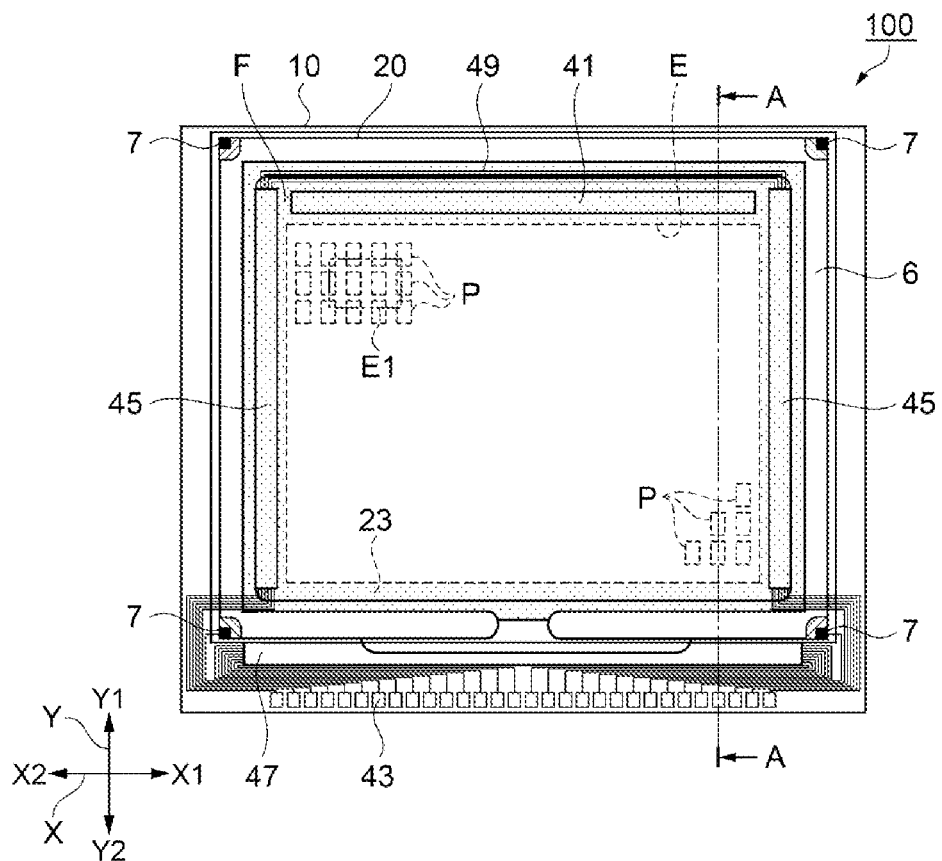
FIG. 1 is a schematic plan view of a liquid crystal apparatus according to a first embodiment.
Figure 2:
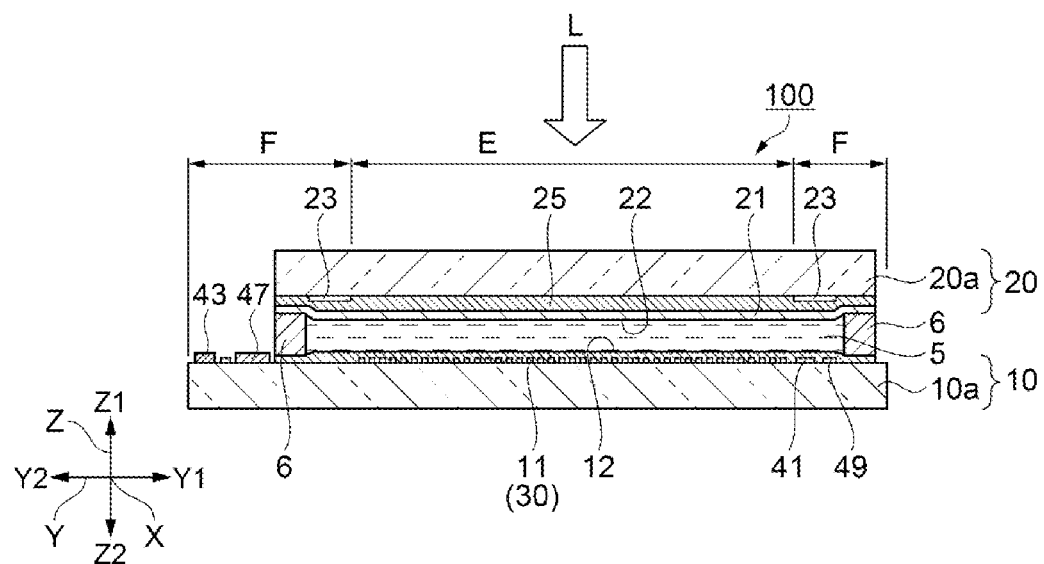
FIG. 2 is a schematic cross-sectional view taken along line A-A in FIG. 1.

A structure of a liquid crystal apparatus that is an electro-optical device according to the present embodiment will be described with reference to FIG. 1 and FIG. 2. FIG. 1 is a schematic plan view illustrating a configuration of a transmissive liquid crystal apparatus that is the electro-optical device according to the first embodiment. FIG. 2 is a schematic cross-sectional view illustrating a structure of the liquid crystal apparatus taken along line A-A in FIG. 1.

As illustrated in FIG. 1 and FIG. 2, a liquid crystal apparatus 100 of the present embodiment includes an element substrate 10, a counter substrate 20 disposed opposite to the element substrate 10, and a liquid crystal layer 5 serving as an electro-optical layer sandwiched between the element substrate 10 and the counter substrate 20.

A substrate such as a glass substrate or a quartz substrate, for example, is used for a substrate 10a serving as a substrate for the element substrate 10. A transparent substrate such as a glass substrate or a quartz substrate, for example, is used for a substrate 20a for the counter substrate 20.

The element substrate 10 has a larger shape than the counter substrate 20 in plan view. The element substrate 10 and the counter substrate 20 are bonded to each other via a sealing material 6 disposed along the outer edge of the counter substrate 20. Liquid crystals having positive or negative dielectric anisotropy are encapsulated in a gap between the element substrate 10 and the counter substrate 20 to constitute the liquid crystal layer 5.

A display region E including a plurality of pixels P arrayed in a matrix pattern is provided inside the sealing material 6. A peripheral region F is on the outer side of the display region E. In the peripheral region F, a boundary portion 23 made of a light shielding material is provided along the outer edge of the display region E between the sealing material 6 and the display region E. Dummy pixels (not illustrated) that do not contribute to display are provided at a position overlapping the boundary portion 23 in plan view.

The peripheral region F of the element substrate 10 is provided with a terminal portion in which a plurality of external coupling terminals 43 are arrayed. In the peripheral region F, a data-line drive circuit 47 is provided between a first side portion along the terminal portion, and the sealing material 6. Furthermore, in the peripheral region F, an inspection circuit 41 is provided between the sealing material 6 along a second side portion opposite to the first side portion, and the display region E.

Furthermore, in the peripheral region F, scanning-line drive circuits 45 are provided between the sealing material 6 along a third side portion and a fourth side portion that are opposite to each other and are orthogonal to the first side portion, and the display region E. Between the sealing material 6 along the second side portion and the inspection circuit 41, a plurality of lines of wiring 49 coupling the two scanning-line drive circuits 45 are provided.

The lines of wiring 49 coupled to the data-line drive circuit 47 and the scanning-line drive circuits 45 are coupled to the plurality of external coupling terminals 43 arrayed along the first side portion. Note that the arrangement of the inspection circuit 41 is not limited to the above.

Here, in the present specification, the direction along the first side portion of the substrate 10a, that is, the X1 direction along the X-axis corresponds to a first direction.

As illustrated in FIG. 2, the surface of the substrate 10a on the liquid crystal layer 5 side is provided with a pixel electrode 11 having optical transparency and a TFT 30 that are provided for each of the pixels P, as well as the wiring 49 and an alignment film 12 covering these components. The TFT 30 and the pixel electrode 11 are constituent elements of the pixel P. The element substrate 10 includes the substrate 10a, as well as the pixel electrode 11, the TFT 30, the wiring 49, and the alignment film 12 that are provided at the substrate 10a.

The surface of the substrate 20a on the liquid crystal layer 5 side is provided with the boundary portion 23, an insulating layer 25 that is formed to cover the boundary portion 23, a counter electrode 21 serving as a common electrode provided to cover the insulating layer 25, and an alignment film 22 that covers the counter electrode 21. The counter substrate 20 in the present embodiment includes at least the boundary portion 23, the counter electrode 21, and the alignment film 22. While an example where the counter electrode 21 is provided on the counter substrate 20 side to server as the common electrode is described in the present embodiment, the common electrode may be provided on the element substrate 10 side.

As illustrated in FIG. 1, the scanning-line drive circuits 45 and the inspection circuit 41 overlap the boundary portion 23 in plan view. The boundary portion 23 blocks light L from a laser light source (not illustrated) incident from the counter substrate 20 side, so that the light L is not incident on peripheral circuits such as the scanning-line drive circuits 45, to prevent the peripheral circuits from malfunctioning.

The insulating layer 25 is made of, for example, an inorganic material such as silicon oxide $SiO_2$ having optical transparency. The insulating layer 25 is provided to cover the boundary portion 23 and to make the side on the liquid crystal layer 5 side flat.

The counter electrode 21 covers the insulating layer 25 and is electrically coupled to vertical conduction portions 7 provided at the four corners of the counter substrate 20. The vertical conduction portions 7 are electrically coupled to common wiring 18 serving as capacitance wiring described below, on the element substrate 10 side.

The pixel electrode 11 and the counter electrode 21 are formed of, for example, a transparent conductive film such as indium tin oxide (ITO) and indium zinc oxide (IZO). The alignment film 12 and the alignment film 22 are selected based on an optical design of the liquid crystal apparatus 100. A material for forming the alignment films 12 and 22 includes an inorganic alignment film such as silicon oxide and an organic alignment film such as polyimide.

The liquid crystal apparatus 100 thus configured employs an optical design of a normally white mode in which the light transmittance of the pixel P with no voltage applied thereto is higher than the transmittance with voltage applied thereto, and of a normally black mode in which the transmittance of the pixel P with no voltage applied thereto is smaller than the transmittance with voltage applied thereto. In the liquid crystal apparatus 100, a polarizing element is disposed on each of the light incidence side and the light exit side in accordance with the optical design.

In the present embodiment, an example is described in which the optical design of the normally black mode is applied, using the inorganic alignment films described above as the alignment films 12 and 22 and the liquid crystals having negative dielectric anisotropy serving as the liquid crystal layer 5.

1.2 Overview of Electrical Configuration of Liquid Crystal Apparatus

Figure 3:
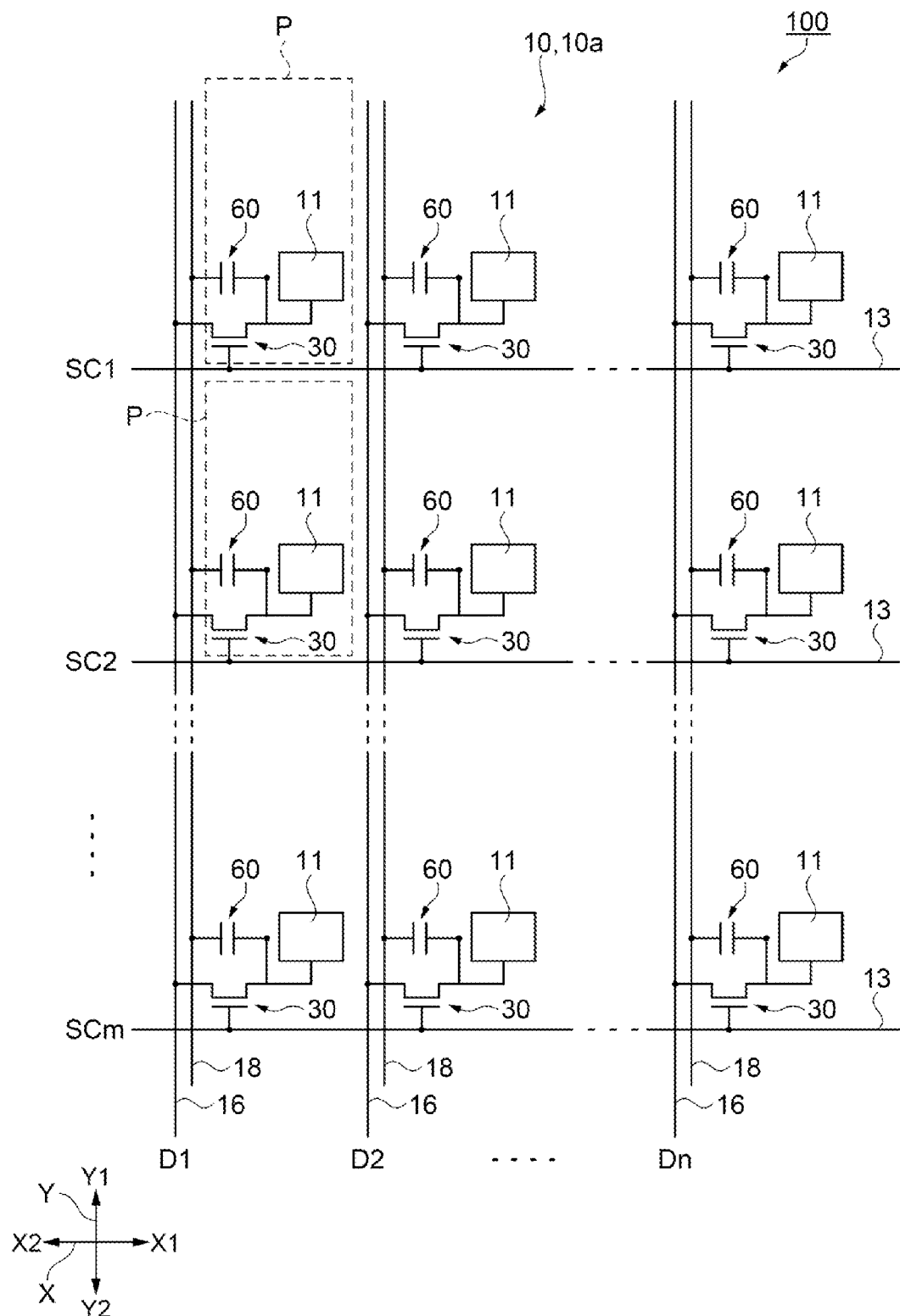
FIG. 3 is an equivalent circuit diagram illustrating an electrical configuration of the liquid crystal apparatus.

Next, an electrical configuration of the liquid crystal apparatus 100 will be described below with reference to FIG. 3. FIG. 3 is an equivalent circuit diagram illustrating the electrical configuration of the liquid crystal apparatus.

As illustrated in FIG. 3, the liquid crystal apparatus 100 includes scanning lines 13, data lines 16, and the common wiring 18 serving as light shielding members at the substrate 10a of the element substrate 10. The scanning lines 13 extend in the X1 direction serving as the first direction. The data lines 16 and the common wiring 18 extend in the Y1 direction. In FIG. 3, the common wiring 18 is illustrated to extend along the Y1 direction, but this should not be construed in a limiting sense.

The pixel P is a region defined by the scanning lines 13 and the data lines 16. The pixel P is provided with the pixel electrode 11, the TFT 30, and a capacitance element 60.

The scanning line 13 is electrically coupled to a gate electrode of the TFT 30, and the data line 16 is electrically coupled to a source of the TFT 30. The scanning line 13 has a function of simultaneously controlling the TFTs 30 in the same row to turn ON and OFF. The pixel electrode 11 is electrically coupled to a drain of the TFT 30.

The data lines 16 are electrically coupled to the data-line drive circuit 47, and supply image signals D1, D2, . . . and Dn supplied from the data-line drive circuit 47 to the pixels P. The scanning lines 13 are electrically coupled to the scanning-line drive circuits 45 and supply scan signals SC1, SC2, . . . , and SCm supplied from the scanning-line drive circuits 45 to the pixels P.

The image signals D1 to Dn supplied from the data-line drive circuit 47 to the data lines 16 may be line-sequentially supplied in this order, or may be supplied to the plurality of respective data lines 16 adjacent to each other in groups. The scanning-line drive circuits 45 line-sequentially supply the scan signals SC1 to SCm to the scanning lines 13 at predetermined timings.

When the scanning signal SC1 is input to the TFT 30, the TFT 30 is turned ON for a certain period of time. Thus, the image signal D1 supplied from the data line 16 is written to the pixel electrode 11 at a predetermined timing. The image signal D1 at a predetermined level written to the liquid crystal layer 5 via the pixel electrode 11 is held for a predetermined period of time between the pixel electrode 11 and the counter electrode 21 disposed to face the pixel electrode 11 with the liquid crystal layer 5 provided in between.

To prevent the image signal D1 thus held from leaking, the capacitance element 60 is electrically coupled to a liquid crystal capacitor provided between the pixel electrode 11 and the counter electrode 21. The capacitance element 60 includes one electrode electrically coupled to the common wiring 18 to which a common potential that is a constant potential is applied, and includes the other electrode electrically coupled to the drain of the TFT 30 and the pixel electrode 11.

Although not elaborated in FIG. 3, the inspection circuit 41 is coupled to the data line 16. Thus, during a manufacturing process for the liquid crystal apparatus 100, the image signals D1, D2, . . . and Dn can be detected, to check operation failure or the like of the liquid crystal apparatus 100.

1.3. Overview of Configuration of Element Substrate

Figure 4:
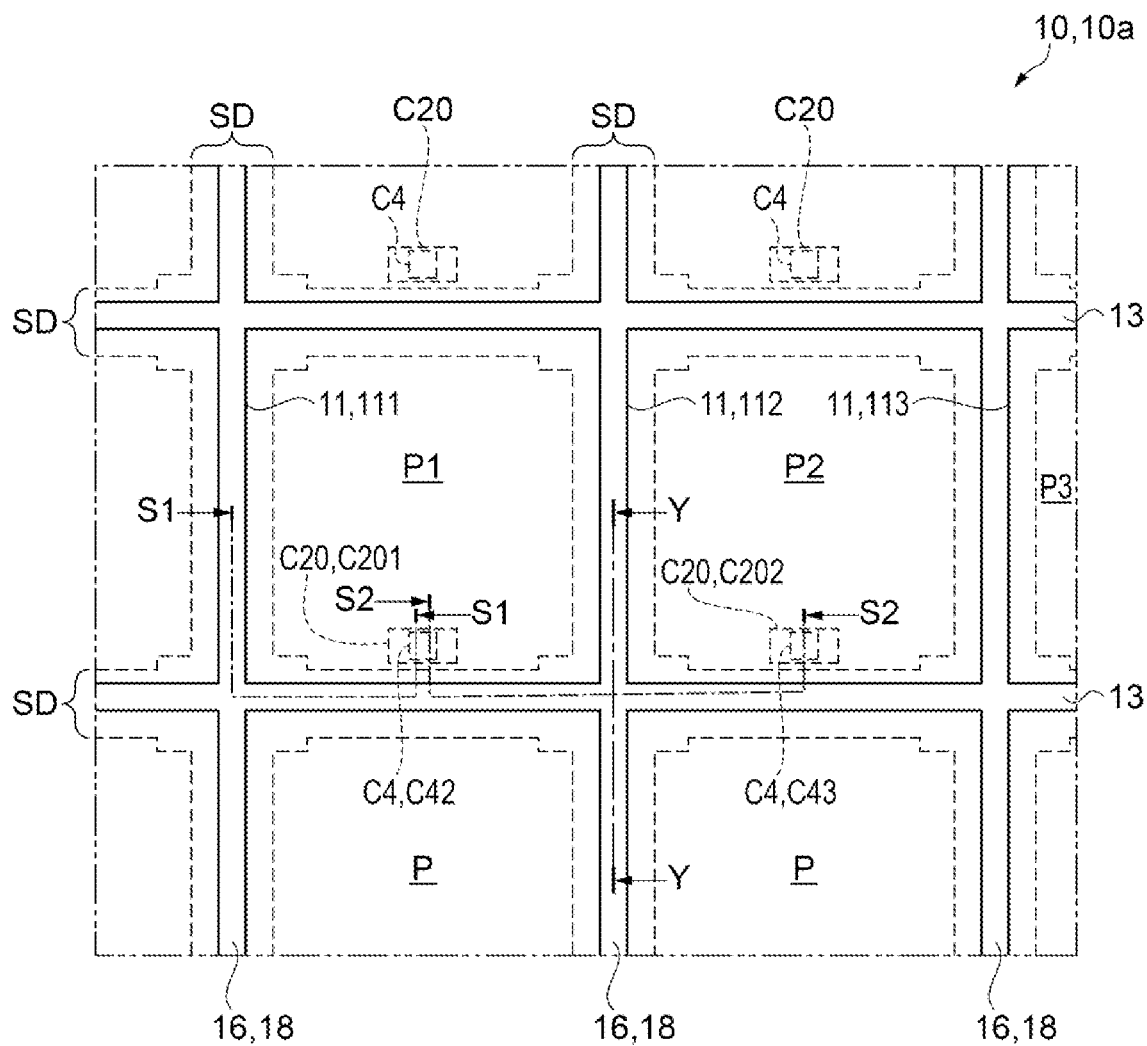
FIG. 4 is a plan view of a pixel.
Figure 4:
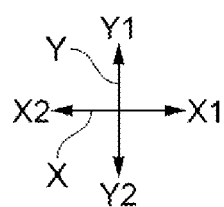
Figure 5A:
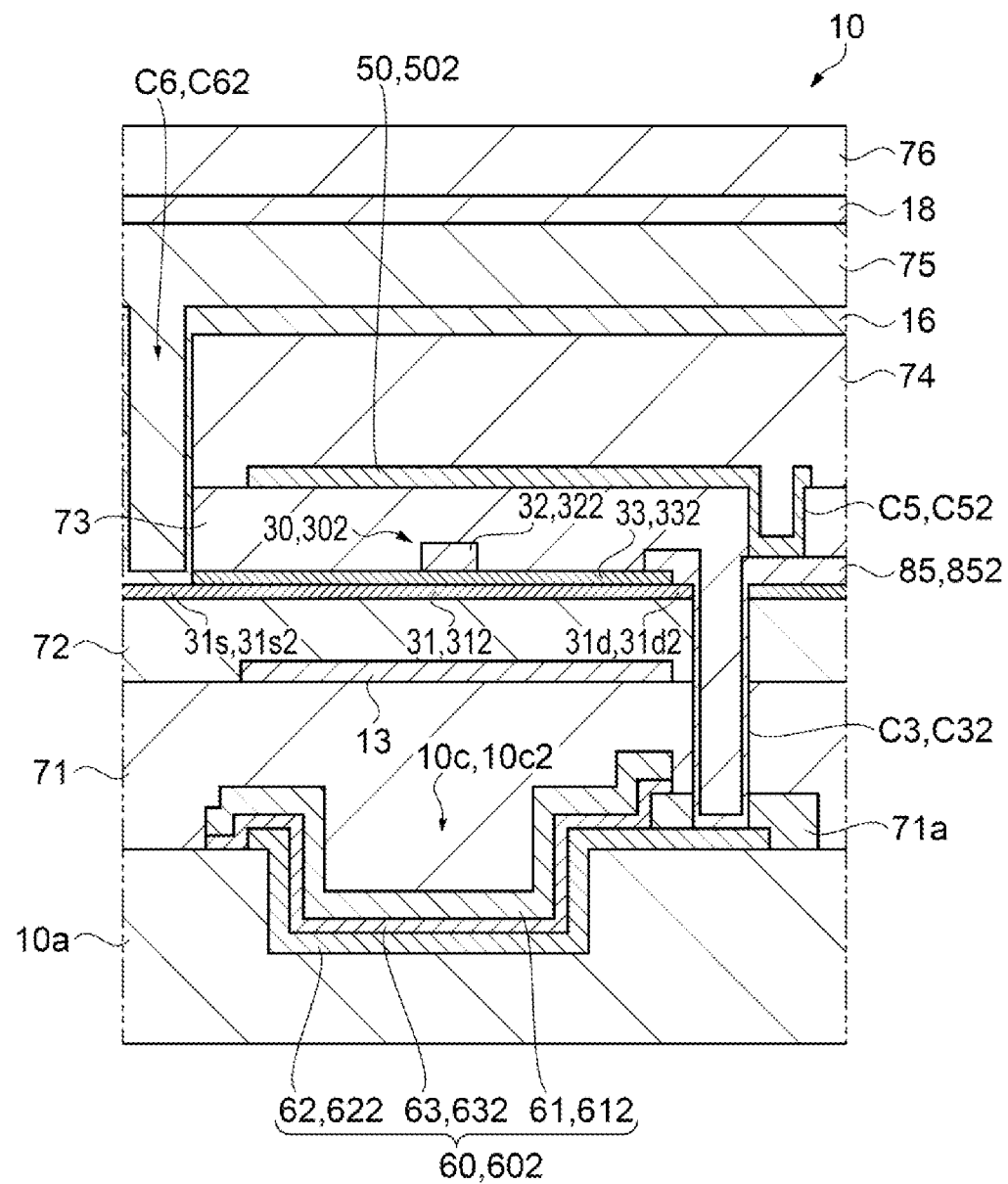
FIG. 5A is a cross-sectional view taken along line Y-Y in FIG. 4.
Figure 5B:
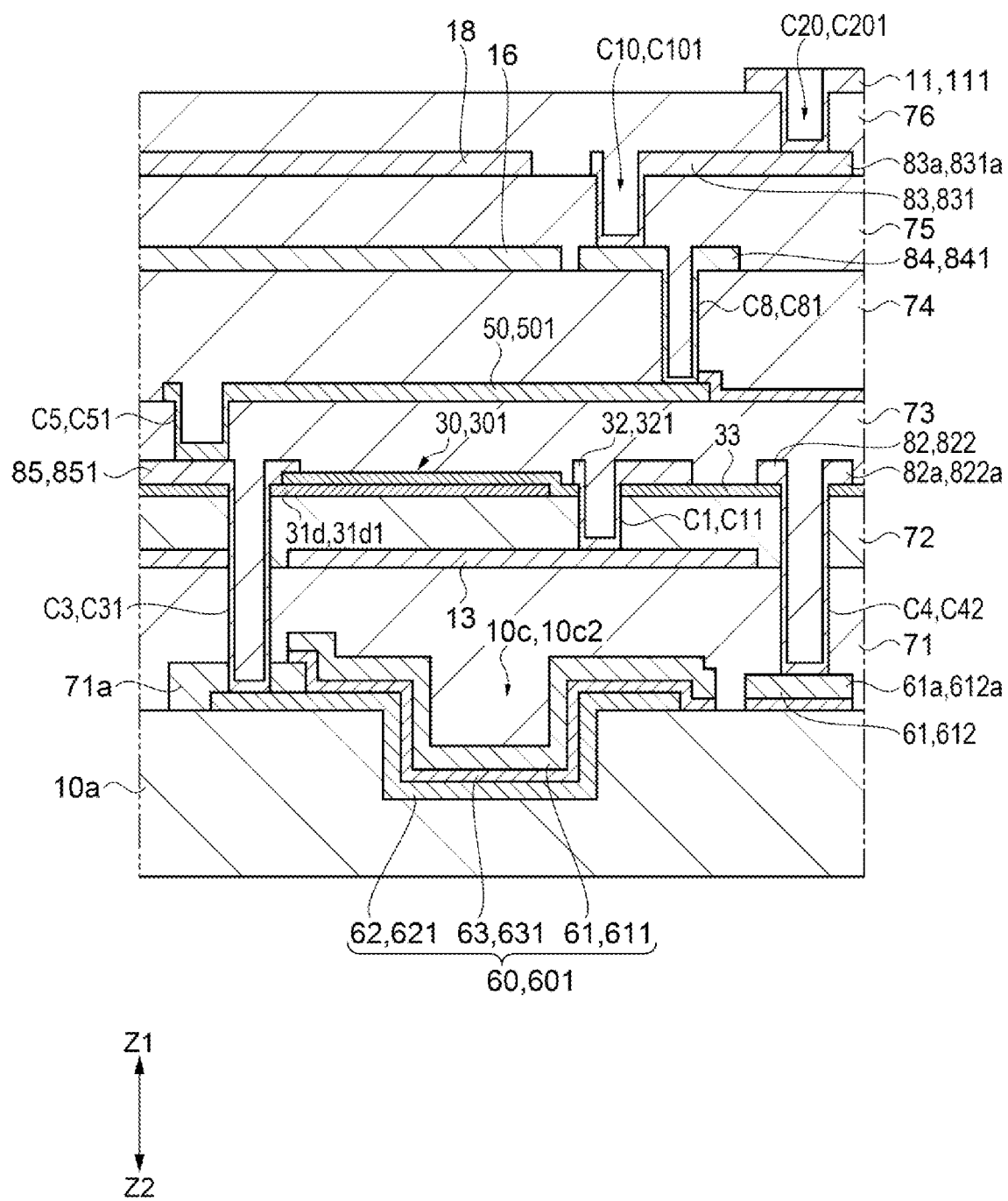
FIG. 5B is a cross-sectional view taken along line S1-S1 in FIG. 4.
Figure 5C:
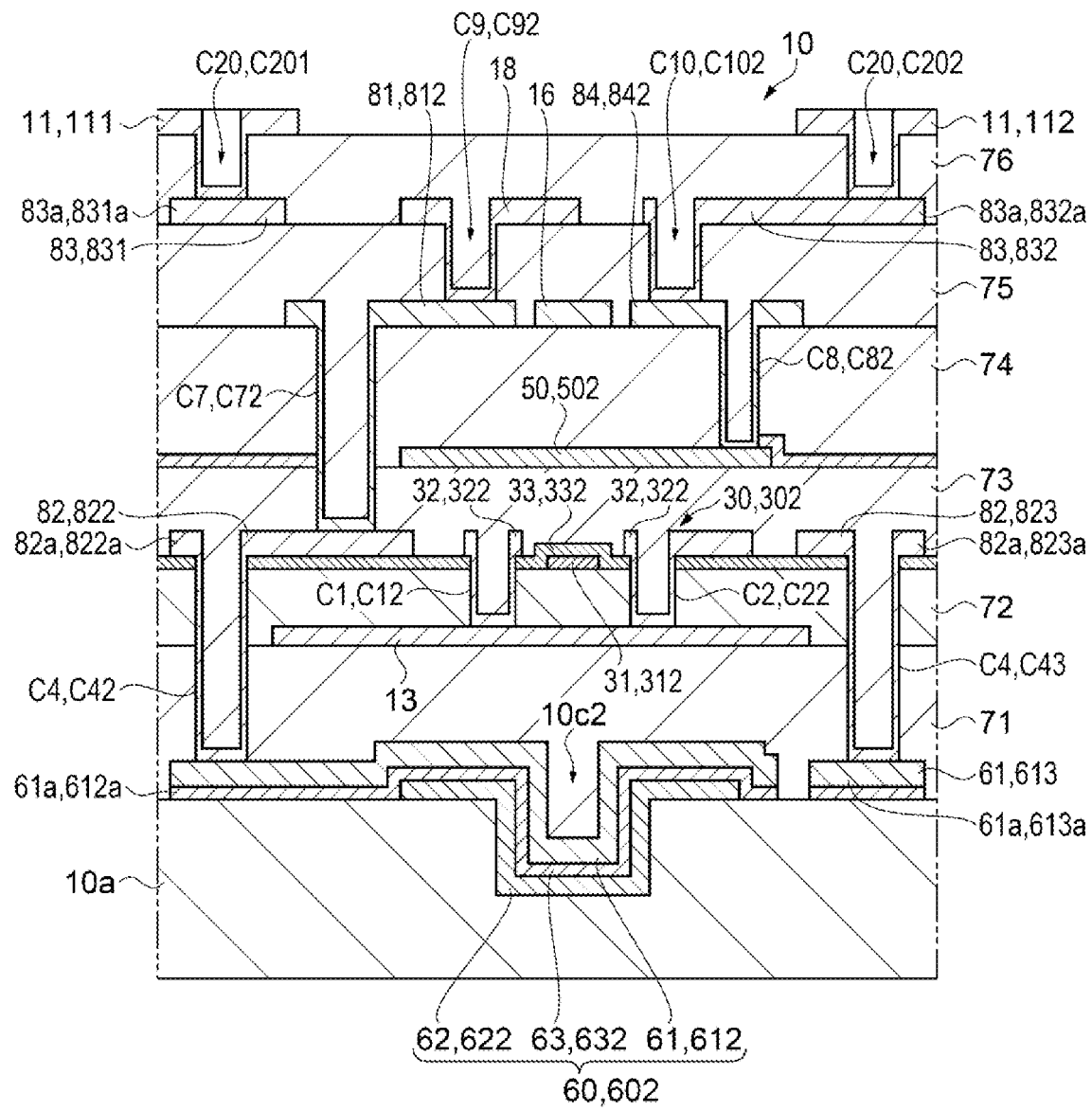
FIG. 5C is a cross-sectional view taken along line S2-S2 in FIG. 4.

Next, a configuration of the pixel P, in plan view and cross-sectional view, in the element substrate 10 will be described with reference to FIG. 4, FIG. 5A, FIG. 5B, and FIG. 5C. FIG. 4 is a plan view of a pixel and illustrates a region E1, which is a part of the display region E in FIG. 1. FIG. 5A is a cross-sectional view taken along line Y-Y in FIG. 4, FIG. 5B is a cross-sectional view taken along line S1-S1 in FIG. 4, and FIG. 5C is a cross-sectional view taken along line S2-S2 in FIG. 4. FIG. 5A, FIG. 5B, and FIG. 5C do not illustrate the alignment film 12.

As illustrated in FIG. 4, a light shielded region SD indicated by broken lines is provided in a lattice shape so as to surround light transmitting regions of the pixels P. In the light shielded region SD, a portion extending along the X-axis is a portion for which the light is blocked mainly by the scanning line 13, and a portion extending along the Y-axis is a portion for which the light is blocked mainly the data line 16 and the common wiring 18.

The light shielded region SD overlaps the pixel electrode 11 in plan view. In the light shielded region SD, the TFT 30 and the capacitance element 60, which are not illustrated, are disposed. The pixel electrode 11 is electrically coupled to the TFT 30 and the capacitance element 60 through a contact hole C20 serving as a first contact hole.

A contact hole C4 serving as a second contact hole is disposed at a position overlapping the contact hole C20 in plan view. Specifically, a contact hole C201 serving as a first contact hole for a pixel P1 overlaps in plan view a contact hole C42 serving as a second contact hole for a pixel P2 adjacent to the pixel P1 in the X1 direction serving as the first direction. A contact hole C202 serving as a first contact hole for the pixel P2 overlaps in plan view a contact hole C43 serving as a second contact hole for a pixel P3 adjacent to the pixel P2 in the X1 direction.

These pixel P1, pixel P2, and pixel P3 have the same configuration in plan view and cross-sectional view. Thus, the same configurations are denoted by same reference numerals in the description. The configurations of the pixel P1, the pixel P2, and the pixel P3 distinguished from each other in the description are denoted by different reference numerals.

Specifically, a configuration of the pixel P1 has a common reference numeral and 1 added to the end. Similarly, a configuration of the pixel P2 has a common reference numeral and 2 added to the end, and a configuration of the pixel P3 has a common reference numeral and 3 added to the end. For example, in the case of the pixel electrode 11, a pixel electrode 111 is a configuration of the pixel P1, a pixel electrode 112 is a configuration of the pixel P2, and a pixel electrode 113 is a configuration of the pixel P3. Similarly, in the case of the contact hole C20, the contact hole C201 is a configuration of the pixel P1, and the contact hole C202 is a configuration of the pixel P2. The same applies to other configurations in the following description.

As illustrated in FIG. 5A, FIG. 5B, and FIG. 5C, the element substrate 10 is configured with a plurality of functional layers stacked at the substrate 10a serving as the base.

Specifically, at the substrate 10a, a first conductive layer, a second conductive layer, a semiconductor layer 31 of a TFT 30, a third conductive layer, a fourth conductive layer, a fifth conductive layer, a sixth conductive layer, a seventh conductive layer, and the pixel electrodes 11 are stacked in this order. The first conductive layer includes a second capacitance electrode 62 of the capacitance element 60. The second conductive layer includes a first capacitance electrode 61 of the capacitance element 60. The third conductive layer includes the scanning line 13 as the light shielding member. The fourth conductive layer includes a gate electrode 32 of the TFT 30 and a second relay electrode 82 and a fifth relay electrode 85 as second conductive members. The fifth conductive layer includes a light shielding film 50. The sixth conductive layer includes the data line 16, a first relay electrode 81, and a fourth relay electrode 84. The seventh conductive layer includes the common wiring 18 serving as capacitance wiring and a third relay electrode 83 serving as a first conductive member.

A dielectric film 63 is provided between the second capacitance electrode 62 of the first conductive layer and the first capacitance electrode 61 of the second conductive layer. A first interlayer insulating layer 71 is provided between the second conductive layer and the third conductive layer. A second interlayer insulating layer 72 is provided between the third conductive layer and the semiconductor layer 31. A gate insulating film 33 is provided between the semiconductor layer 31 and the gate electrode 32 of the fourth conductive layer. A third interlayer insulating layer 73 is provided between the fourth conductive layer and the fifth conductive layer. A fourth interlayer insulating layer 74 is provided between the fifth conductive layer and the sixth conductive layer. A fifth interlayer insulating layer 75 is provided between the sixth conductive layer and the seventh conductive layer. A sixth interlayer insulating layer 76 is provided between the seventh conductive layer and the pixel electrode 11.

FIG. 5A illustrates a configuration of the pixel P2. A TFT 302 serving as a second transistor for the pixel P2 and a capacitance element 602 serving as a capacitance element are disposed between the pixel P1 and the pixel P2 adjacent to the pixel P1 in the X1 direction in FIG. 4.

The capacitance element 602 includes a first capacitance electrode 612 disposed on the scanning line 13 side and a second capacitance electrode 622 disposed at the substrate 10a side. The second capacitance electrode 622 is electrically coupled to a fifth relay electrode 852 of the pixel P2 provided in the fourth conductive layer through a contact hole C32 of the pixel P2 provided in the first interlayer insulating layer 71 and the second interlayer insulating layer 72. The fifth relay electrode 852 is electrically coupled to a drain 31d2 of the TFT 302, and is electrically coupled to a light shielding film 502 of the pixel P2 through a contact hole C52 of the pixel P2 provided in the third interlayer insulating layer 73.

A trench 10c2 is provided in the substrate 10a. Part of the capacitance element 602 is provided in the trench 10c2 to increase the capacitance.

The data line 16 is electrically coupled to a source 31s2 of the TFT 302, through a contact hole C62 of the pixel P2 provided in the fourth interlayer insulating layer 74 and the third interlayer insulating layer 73.

FIG. 5B illustrates a configuration in which the pixel electrode 111 serving as a pixel electrode and a capacitance element 601 are electrically coupled to each other in the pixel P1.

The pixel electrode 111 is electrically coupled to a projecting portion 831a serving as a first protrusion portion of a third relay electrode 831 serving as a first conductive member of the pixel P1 provided in the seventh conductive layer, through the contact hole C201 serving as the first contact hole of the pixel P1 provided in the sixth interlayer insulating layer 76.

The third relay electrode 831 is electrically coupled to a fourth relay electrode 841 of the pixel P1 provided in the sixth conductive layer, through a contact hole C101 of the pixel P1 provided in the fifth interlayer insulating layer 75.

The fourth relay electrode 841 is electrically coupled to a light shielding film 501 of the pixel P1 provided in the fifth conductive layer, through a contact hole C81 of the pixel P1 provided in the fourth interlayer insulating layer 74.

The light shielding film 501 is electrically coupled to a fifth relay electrode 851 of the pixel P1 provided in the fourth conductive layer, through a contact hole C51 of the pixel P1 provided in the third interlayer insulating layer 73.

The fifth relay electrode 851 is electrically coupled to a drain 31d1 of a TFT 301 serving as a first transistor of the pixel P1, and is electrically coupled to a second capacitance electrode 621 through a contact hole C31 of the pixel P1 provided in the second interlayer insulating layer 72 and the first interlayer insulating layer 71.

A gate electrode 321 of the TFT 301 is electrically coupled to the scanning line 13 through a contact hole C11 of the pixel P1 provided in the second interlayer insulating layer 72.

FIG. 5B illustrates a configuration in which a projecting portion 612a of the first capacitance electrode 612 of the pixel P2 and a projecting portion 822a serving as a second protrusion portion of a second relay electrode 822 serving as a second conductive member are provided at positions overlapping in the Z1 direction in cross-sectional view. In addition, FIG. 5B illustrates a configuration in which the contact hole C42 serving as the second contact hole provided between the projecting portion 612a and the projecting portion 822a is provided at a position not overlapping the scanning line 13 so as not to interfere with the scanning line 13.

The contact hole C42 is provided through the second interlayer insulating layer 72 and the first interlayer insulating layer 71, to expose the projecting portion 612a of the first capacitance electrode 612 of the capacitance element 602 of the pixel P2 at the bottom of the contact hole C42. The second relay electrode 822 is formed inside the contact hole C42. The second relay electrode 822 is electrically coupled to the projecting portion 612a of the first capacitance electrode 612 at the bottom of the contact hole C42. In the second relay electrode 822, the thickness of a portion formed at the inner walls of the contact hole C42 is smaller than the thickness of a portion formed at a gate insulating film 332.

FIG. 5B and FIG. 5C illustrate a configuration in which the contact hole C201 of the pixel P1 and the contact hole C42 of the pixel P2 are provided at positions overlapping each other in the Z1 direction in cross-sectional view, and a configuration in which the projecting portion 831a of the pixel P1 and the projecting portion 822a and the projecting portion 612a of the pixel P2 are provided at positions overlapping each other in the Z1 direction in cross-sectional view. As illustrated in FIG. 4, the contact hole C201 of the pixel P1 and the contact hole C42 of the pixel P2 are provided at positions overlapping each other in plan view. Thus, the projecting portion 831a of the pixel P1 and the projecting portion 822a and the projecting portion 612a of the pixel P2 are provided at positions overlapping each other in plan view.

FIG. 5C illustrates a configuration in which the common wiring 18 and the capacitance element 602 of the pixel P2 are electrically coupled to each other in the pixel P2.

The common wiring 18 is electrically coupled to a first relay electrode 812 of the pixel P2 provided in the sixth conductive layer, through a contact hole C92 of the pixel P2 provided in the fifth interlayer insulating layer 75. The first relay electrode 812 is electrically coupled to the second relay electrode 822 through a contact hole C72 of the pixel P2 provided in the fourth interlayer insulating layer 74 and the third interlayer insulating layer 73. The second relay electrode 822 is electrically coupled to the first capacitance electrode 612 of the capacitance element 602 through the contact hole C42 of the pixel P2 disposed between the projecting portion 822a of the second relay electrode 822 and the projecting portion 612a of the first capacitance electrode 612 of the capacitance element 602.

FIG. 5C illustrates, in cross-sectional view, a configuration in which the contact hole C202 of the pixel P2 and the contact hole C43 of the pixel P3 illustrated in FIG. 4 are provided at positions overlapping each other in plan view. As illustrated in FIG. 5C, the contact hole C202 of the pixel P2 and the contact hole C43 of the pixel P3 are provided at positions overlapping each other in the Z1 direction in cross-sectional view.

Similarly, a projecting portion 832a of the pixel P2 and a projecting portion 823a and a projecting portion 613a of the pixel P3 are provided at positions overlapping each other in the Z1 direction. Thus, the projecting portion 832a of the pixel P2 and the projecting portion 823a and the projecting portion 613a of the pixel P3 are provided at positions overlapping each other in plan view.

The contact hole C43 is provided through the second interlayer insulating layer 72 and the first interlayer insulating layer 71, to expose the projecting portion 613a of a first capacitance electrode 613 of the pixel P3 at the bottom of the contact hole C43. The first capacitance electrode 613 is electrically coupled to a second relay electrode 823 of the pixel P3 provided in the fourth conductive layer, through the contact hole C43.

As illustrated in FIG. 5C, the gate electrode 322 of the pixel P2 is electrically coupled to the scanning line 13 through a contact hole C12 and a contact hole C22 of the pixel P2 provided in the second interlayer insulating layer 72.

1.4. Overview of Method for Manufacturing Liquid Crystal Apparatus

A method for manufacturing the liquid crystal apparatus 100 of the present embodiment will be described below. A manufacturing process for the element substrate 10 including characteristic parts in the present embodiment in the method for manufacturing the liquid crystal apparatus 100 will be described below with reference to FIG. 6 to FIG. 27.

Figure 6:
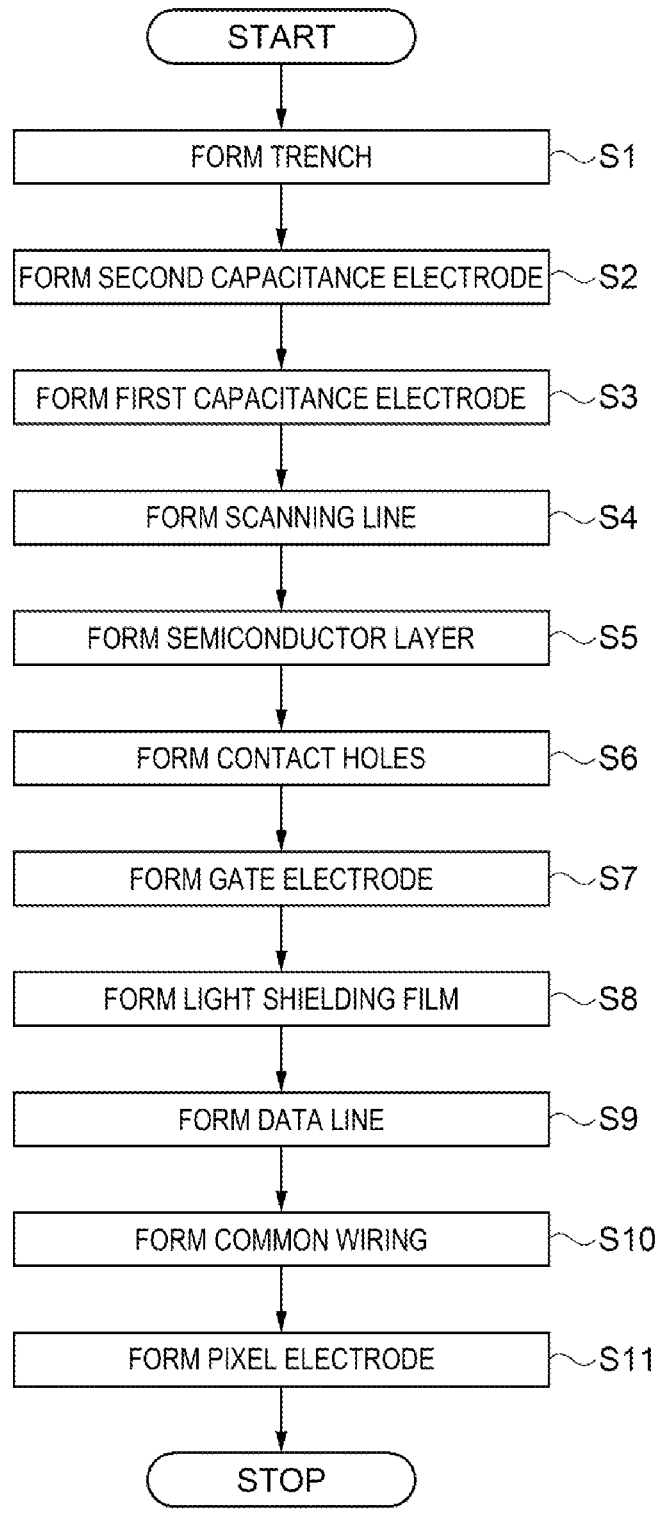
FIG. 6 is a flowchart illustrating a manufacturing process for an element substrate.

FIG. 6 is a flowchart illustrating a manufacturing process for the element substrate. FIG. 7 to FIG. 27 are each a plan view or a cross-sectional view illustrating correspondence of pixels in the procedure for manufacturing the element substrate. Of these figures, the plan views correspond to the plan view in FIG. 4 at respective stages in the manufacturing process. In the cross-sectional views, the positions of line X-X, line Y-Y, and line Z-Z are the same.

Basically, the element substrate 10 can be manufactured by a method used in a known semiconductor process, such as low pressure chemical vapor deposition (CVD), atmospheric pressure CVD, plasma CVD, photolithography, sputtering, etching, and chemical mechanical planarization (CMP), or a combination of these. Hereinafter, a preferable manufacturing method will be mainly described, but other manufacturing methods may be used as long as an equivalent structure can be formed and functions and characteristics of the configuration can be achieved.

In step S1 in FIG. 6, a trench 10c serving as a groove is formed in the substrate 10a. A configuration may be employed in which the trench 10c is provided in an interlayer insulating layer formed at the substrate 10a or in the interlayer insulating layer and the substrate 10a.

Figure 7:
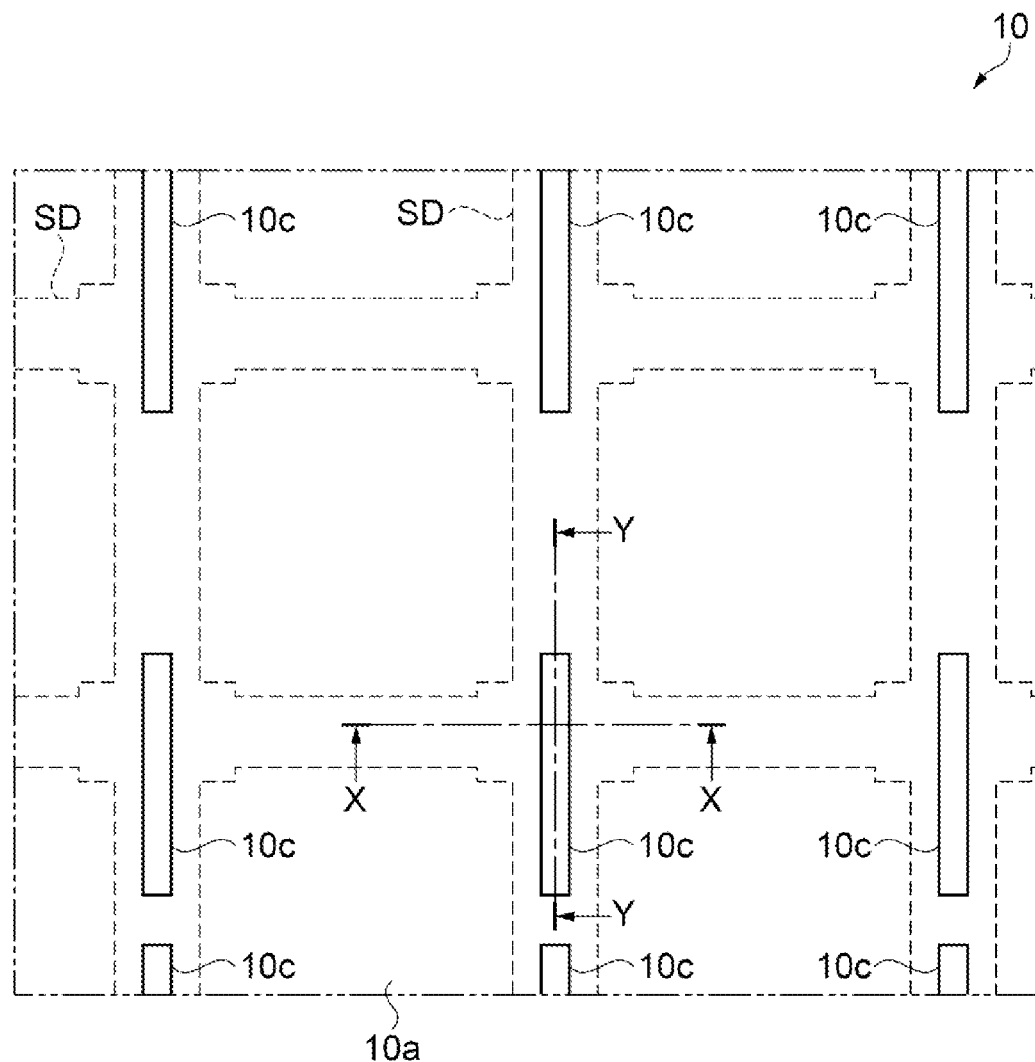
FIG. 7 is a plan view illustrating a mode of a pixel in a trench forming process for the element substrate.
Figure 7:
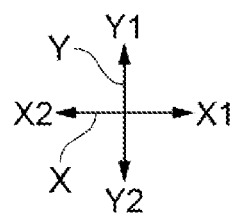
Figure 8A:
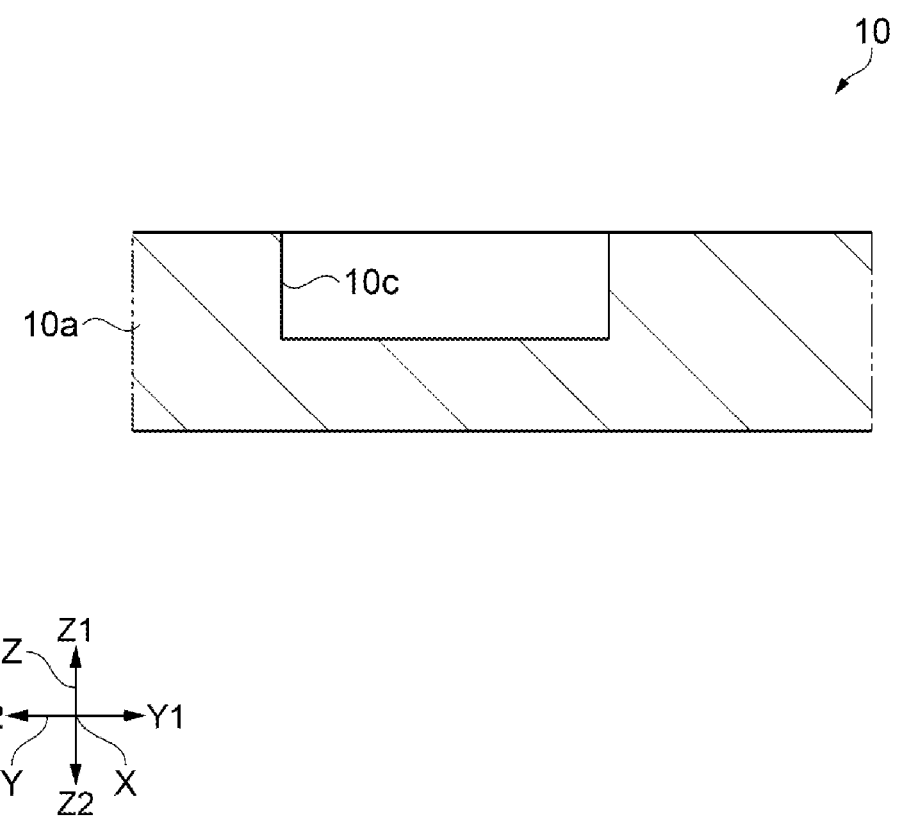
FIG. 8A is a cross-sectional view taken along line Y-Y in FIG. 7.
Figure 8B:
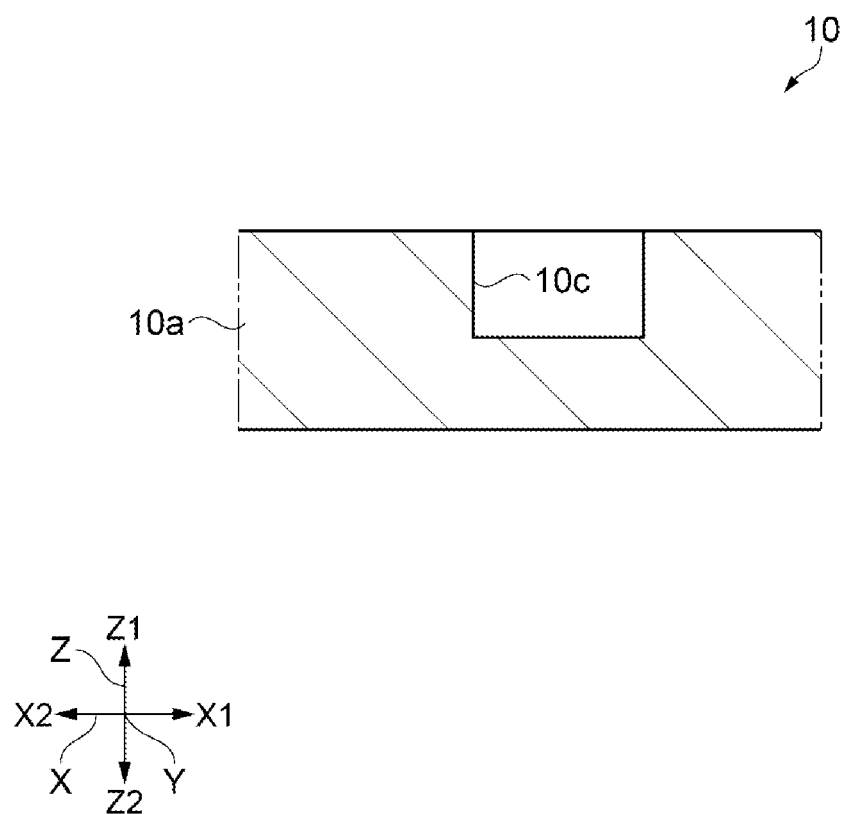
FIG. 8B is a cross-sectional view taken along line X-X in FIG. 7.

FIG. 7 is a plan view illustrating a mode of pixels in the element substrate in the process in step S1. FIG. 8A is a cross-sectional view taken along line Y-Y in FIG. 7. FIG. 8B is a cross-sectional view taken along line X-X in FIG. 7.

As illustrated in FIG. 7, the trench 10c is formed in a rectangular shape elongated in the Y1 direction in the light shielded region SD.

In step S2 in FIG. 6, the second capacitance electrode 62 of the capacitance element 60 is formed in the trench 10c.

Figure 9:
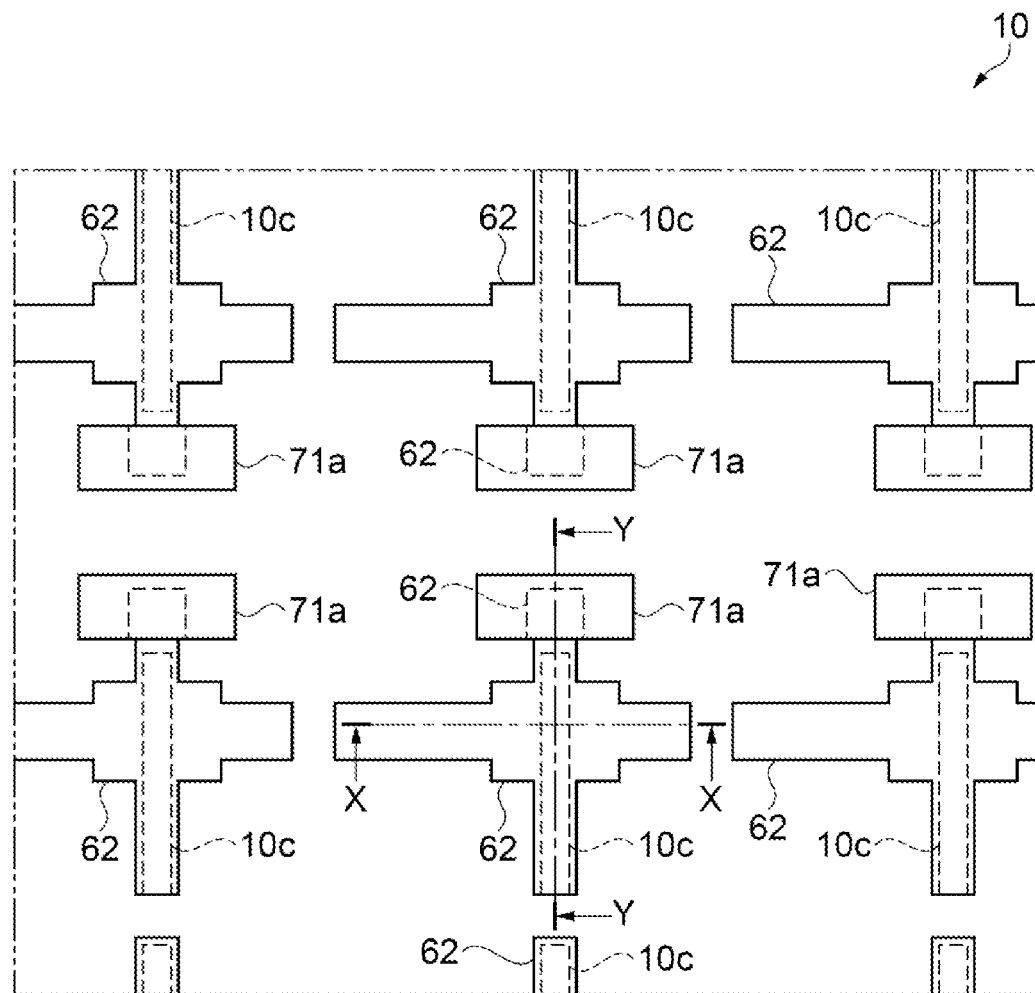
FIG. 9 is a plan view illustrating a mode of pixels in one process for the element substrate.
Figure 9:
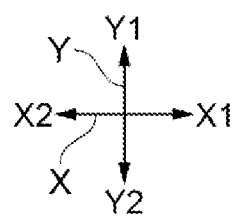
Figure 10A:
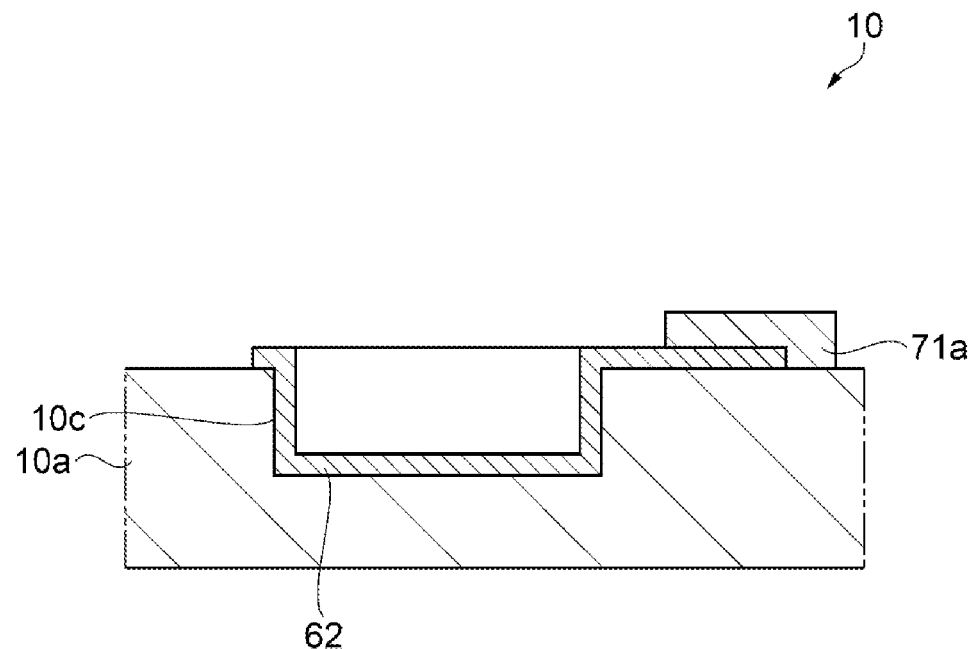
FIG. 10A is a cross-sectional view taken along line Y-Y in FIG. 9.
Figure 10B:
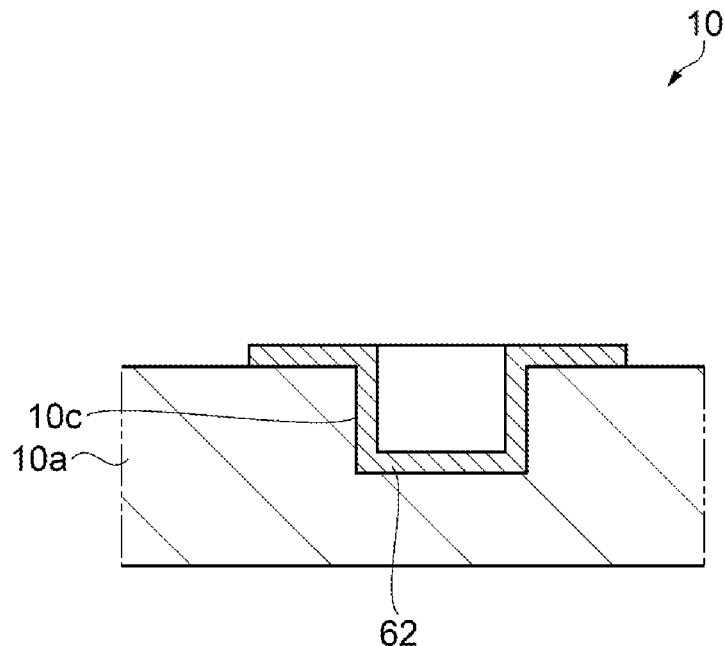
FIG. 10B is a cross-sectional view taken along line X-X in FIG. 9.
Figure 10B:
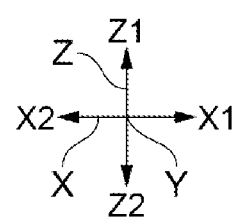

FIG. 9 is a plan view illustrating a mode of pixels in the element substrate in the process in step S2. FIG. 10A is a cross-sectional view taken along line Y-Y in FIG. 9. FIG. 10B is a cross-sectional view taken along line X-X in FIG. 9.

In step S2, the second capacitance electrode 62 made of a conductive polysilicon film is formed at the substrate 10a including the inner walls of the trench 10c. The first conductive layer that is made of phosphorus-containing deposited polysilicon and has a thickness from 50 nm to 100 nm is formed at the substrate 10a, and then patterned by dry etching into the shape illustrated in FIGS. 9, 10A, and 10B, to form the second capacitance electrode 62.

In step S2, after the second capacitance electrode 62 is formed, an oxide film island 71a is formed to cover part of the second capacitance electrode 62. The oxide film island 71a is formed by forming a silicon oxide film such as a tetraethyl orthosilicate (TEOS) film or a high temperature oxide (HTO) film having a thickness of about 100 nm and then patterning the silicon oxide film. The oxide film island 71a is disposed at a position at which a contact hole C3 described below is provided, and functions as an etching stopper film for protecting the second capacitance electrode 62 when the first capacitance electrode 61 described below is patterned.

In step S3 in FIG. 6, the first capacitance electrode 61 of the capacitance element 60 is formed.

Figure 11:
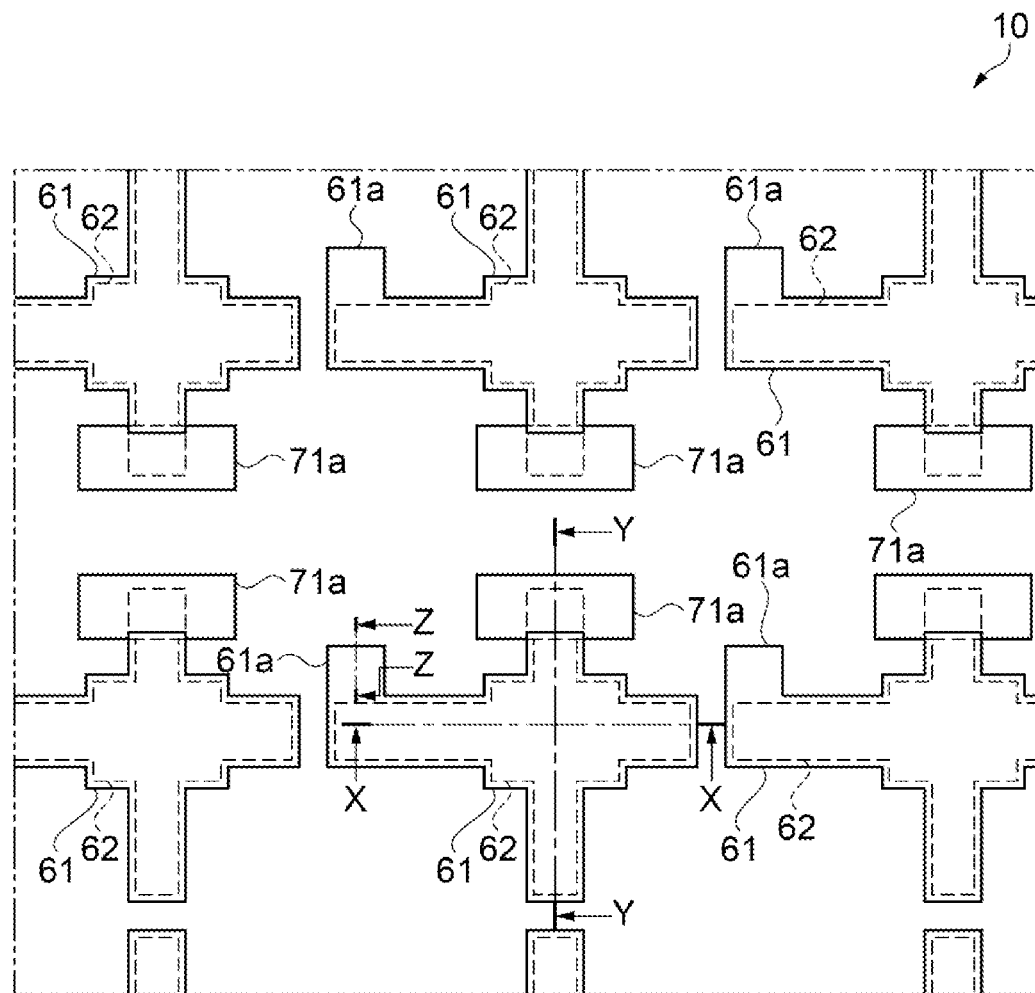
FIG. 11 is a plan view illustrating a mode of pixels in one process for the element substrate.
Figure 11:
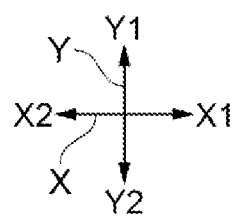
Figure 12A:
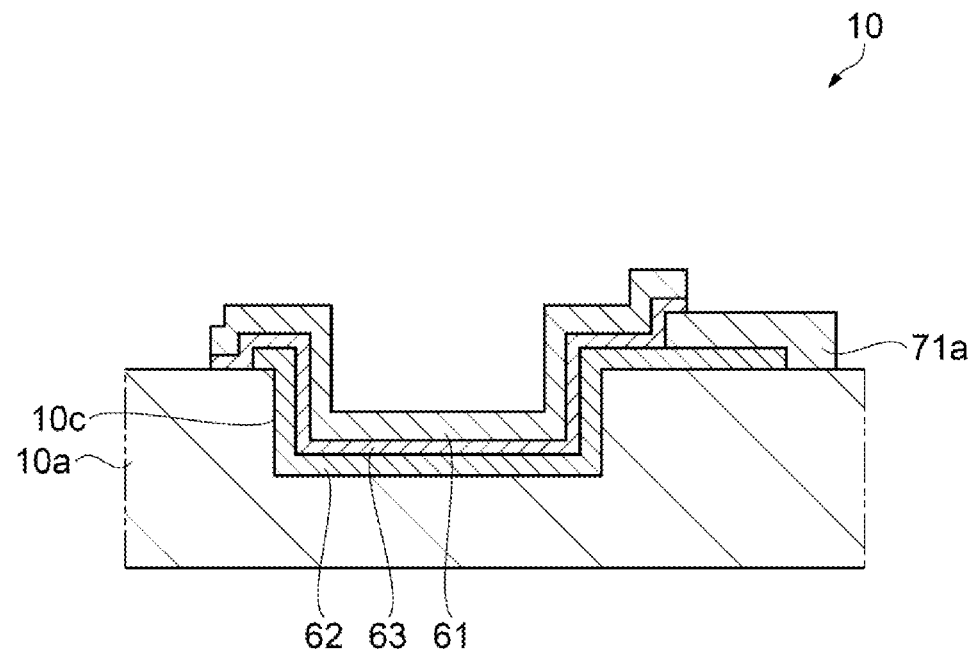
FIG. 12A is a cross-sectional view taken along line Y-Y in FIG. 11.
Figure 12B:
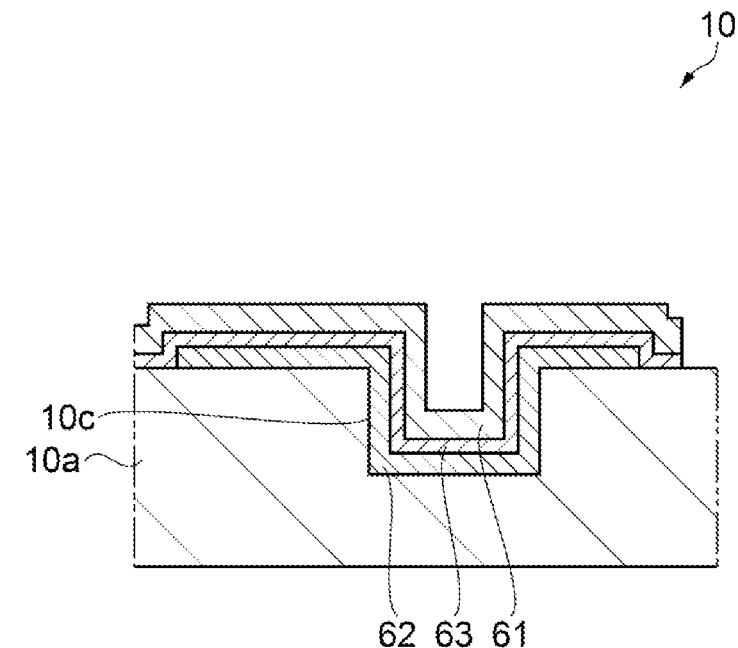
FIG. 12B is a cross-sectional view taken along line X-X in FIG. 11.
Figure 12C:
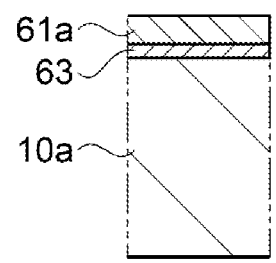
FIG. 12C is a cross-sectional view taken along line Z-Z in FIG. 11.
Figure 12C:
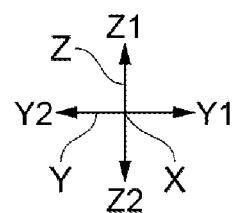

FIG. 11 is a plan view illustrating a mode of pixels in the element substrate in the process in step S3. FIG. 12A is a cross-sectional view taken along line Y-Y in FIG. 11. FIG. 12B is a cross-sectional view taken along line X-X in FIG. 11. FIG. 12C is a cross-sectional view taken along line Z-Z in FIG. 11.

In step S3, first, the dielectric film 63 is formed at the second capacitance electrode 62, and then the first capacitance electrode 61 is formed.

At the second capacitance electrode 62, as the dielectric film 63, a silicon oxide ($SiO_2$) film, a silicon nitride (SiN) film, a metal oxide film ($HfO_2$, $ZrO_2$), or the like having a thickness of 20 nm is formed.

In step S3, thereafter, the first capacitance electrode 61 made of a conductive polysilicon film is formed at the dielectric film 63. In the forming of the first capacitance electrode 61, the second conductive layer that is made of phosphorus-containing deposited polysilicon and has a thickness from 50 nm to 100 nm is formed at the dielectric film 63, and then the dielectric film 63 and the first capacitance electrode 61 are patterned by dry etching, to form the first capacitance electrode 61.

As illustrated in FIG. 11, the first capacitance electrode 61 is formed to have an area one size larger than that of the second capacitance electrode 62 except for a portion provided with the contact hole C3, in which the fifth relay electrode 85 described below is provided. As illustrated in FIG. 12A and FIG. 12B, the dielectric film 63 is formed to have the same shape as the second capacitance electrode 62, and has an outer edge portion part of which covers the second capacitance electrode 62 and is in contact with the substrate 10a.

As illustrated in FIG. 12A, part of the first capacitance electrode 61 overlapping the oxide film island 71a is removed by the patterning.

As illustrated in FIG. 11, the first capacitance electrode 61 includes a projecting portion 61a projecting along the Y-axis direction. The contact hole C4 illustrated in FIG. 5B and FIG. 5C is provided at the position of the projecting portion 61a. Through the contact hole C4, the first capacitance electrode 61 and the second relay electrode 82 are electrically coupled to each other.

In step S4 in FIG. 6, the scanning line 13 is formed.

Figure 13:
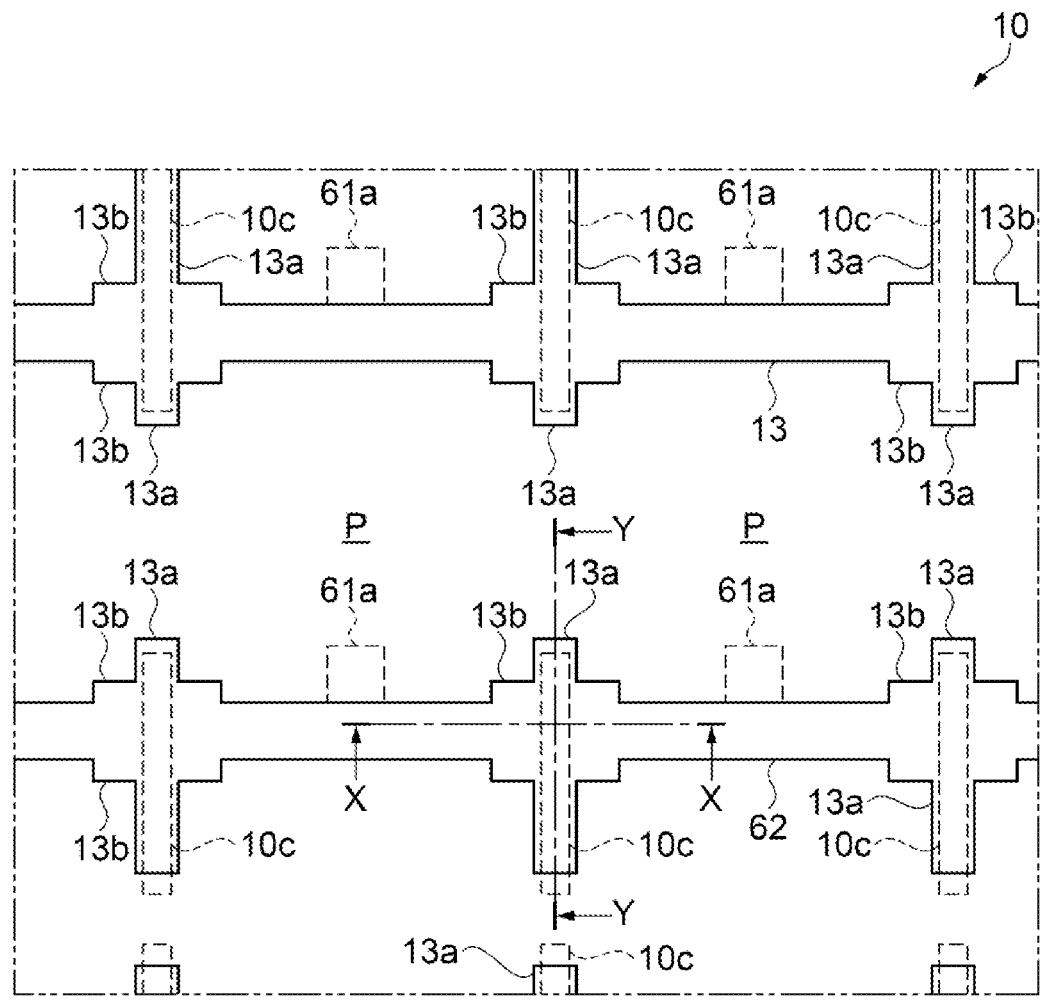
FIG. 13 is a plan view illustrating a mode of pixels in one process for the element substrate.
Figure 13:
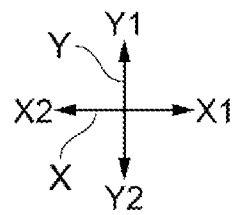
Figure 14A:
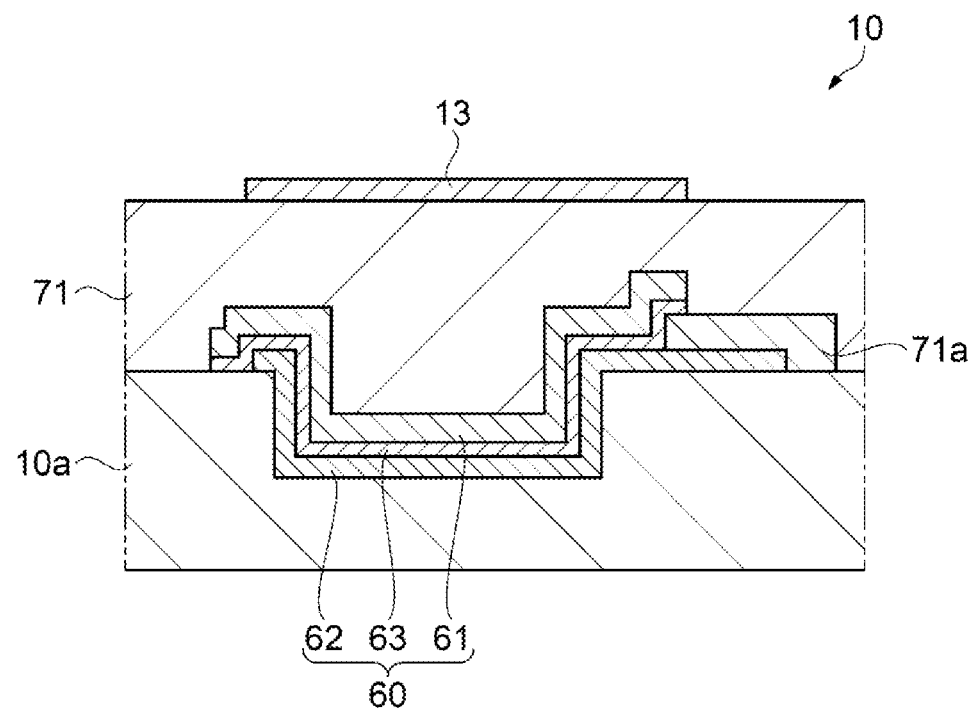
FIG. 14A is a cross-sectional view taken along line Y-Y in FIG. 13.
Figure 14A:
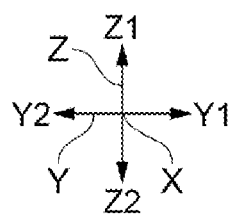
Figure 14B:
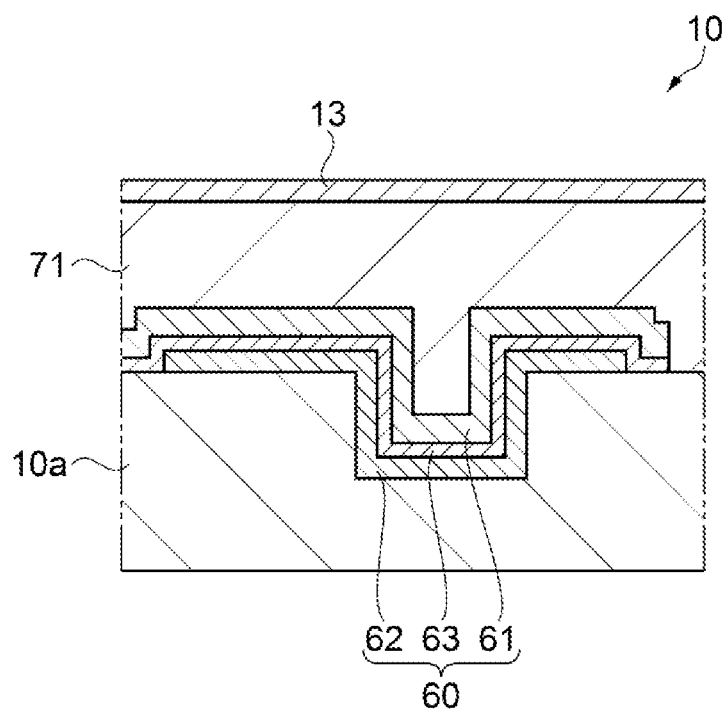
FIG. 14B is a cross-sectional view taken along line X-X in FIG. 13.
Figure 14B:
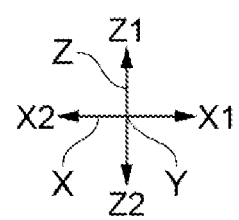

FIG. 13 is a plan view illustrating a mode of pixels in the element substrate in the process in step S4. FIG. 14A is a cross-sectional view taken along line Y-Y in FIG. 13. FIG. 14B is a cross-sectional view taken along line X-X in FIG. 13.

In Step S4, first, the first interlayer insulating layer 71 is formed at the first capacitance electrode 61, and then the scanning line 13 is formed. The first interlayer insulating layer 71 is made of, for example, a silicon oxide film made of TEOS, and has a thickness from 400 nm to 600 nm.

In the forming of the scanning line 13, the third conductive layer made of a tungsten silicide (WSi) film having a thickness from 100 nm to 400 nm is formed at the first interlayer insulating layer 71, and then is patterned as illustrated FIG. 13 to form the scanning line 13. The scanning line 13 extends along the X-axis, and includes, at a position overlapping the trench 10c in plan view, a projecting portion 13a projecting in the Y1 direction and the Y2 direction and a wide portion 13b widened in the X1 direction and the X2 direction. Contact holes C1 and C2 to be described below are formed at the position of the wide portion 13b. The scanning line 13 is formed of a metal material having light shielding property, and thus functions as a light shielding portion for the TFT 30.

As illustrated in FIG. 13, the projecting portion 61a of the first capacitance electrode 61 of the capacitance element 60 protrudes from the scanning line 13 along the Y-axis direction in plan view. In other words, the projecting portion 61a is provided in the light transmitting region of the pixel P in plan view.

In step S5 in FIG. 6, the semiconductor layer 31 of the TFT 30 is formed.

Figure 15:
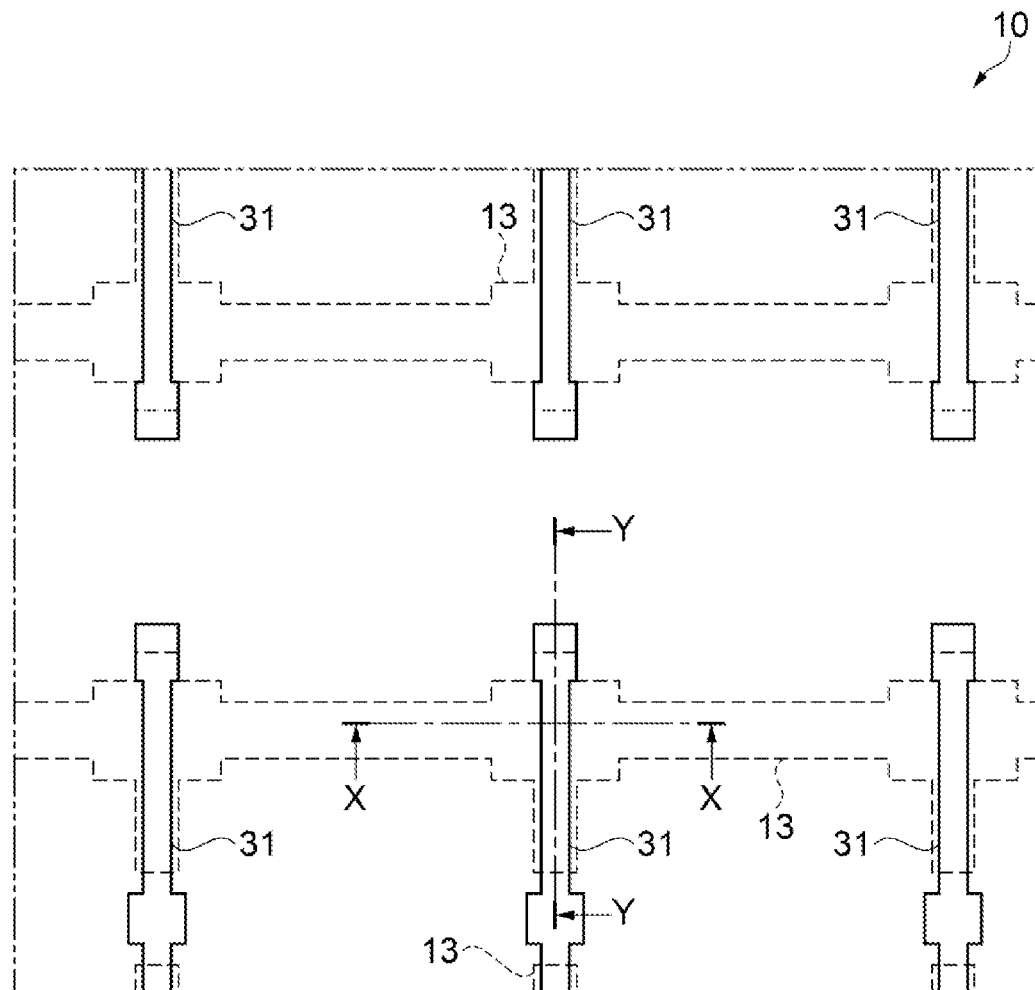
FIG. 15 is a plan view illustrating a mode of pixels in one process for the element substrate.
Figure 15:
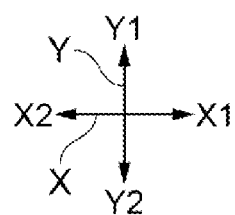
Figure 16A:
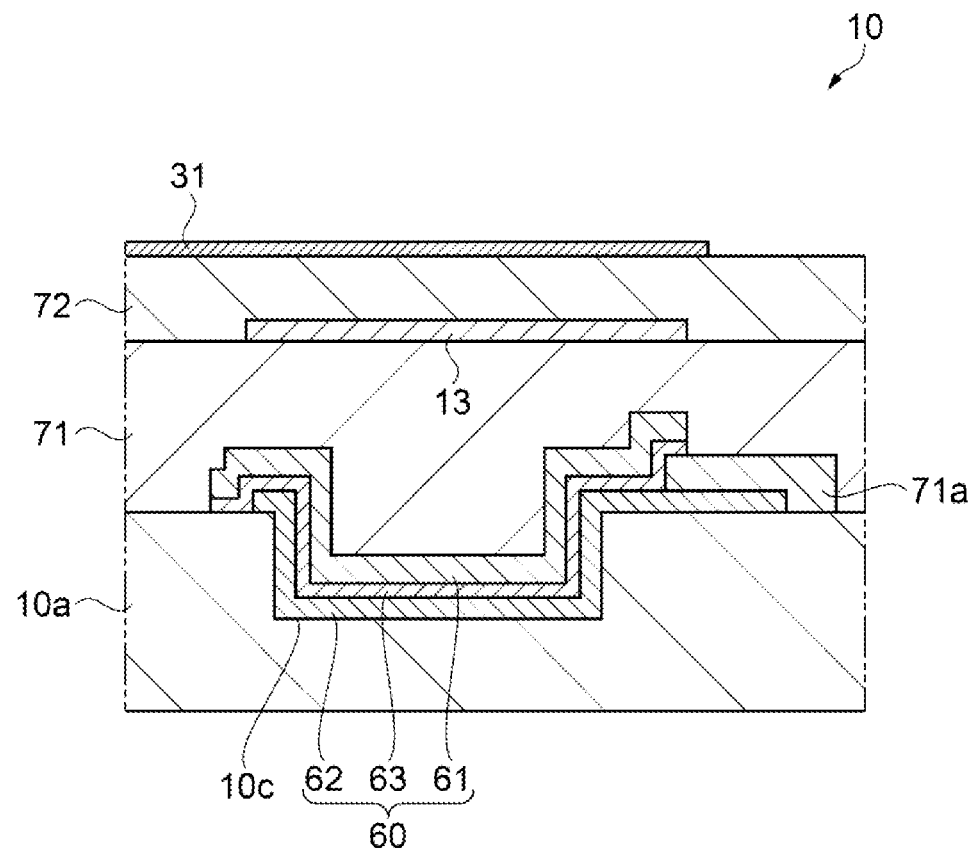
FIG. 16A is a cross-sectional view taken along line Y-Y in FIG. 15.
Figure 16B:
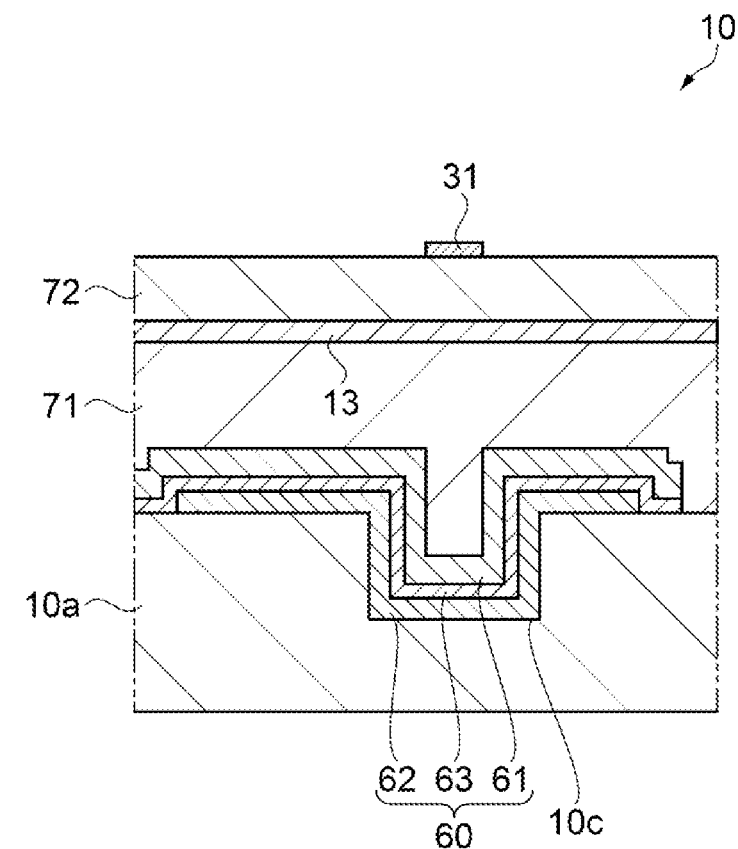
FIG. 16B is a cross-sectional view taken along line X-X in FIG. 15.
Figure 16B:
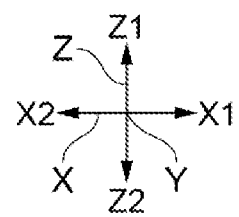

FIG. 15 is a plan view illustrating a mode of pixels in the element substrate in the process in step S5. FIG. 16A is a cross-sectional view taken along line Y-Y in FIG. 15. FIG. 16B is a cross-sectional view taken along line X-X in FIG. 15.

In Step S5, first, the second interlayer insulating layer 72 is formed at the scanning line 13, and then the semiconductor layer 31 is formed.

The second interlayer insulating layer 72 is made of, for example, a TEOS film, and has a thickness from 200 nm to 600 nm.

In the forming of the semiconductor layer 31, after an amorphous silicon film is formed at the second interlayer insulating layer 72, the semiconductor layer 31 made of polysilicon is formed by heat treatment.

As illustrated in FIGS. 15, 16A, and 16B, a channel of the semiconductor layer 31 is provided to overlap the trench 10c in plan view.

In step S6 in FIG. 6, the contact holes C1, C2, C3, and C4 are formed.

Figure 17:
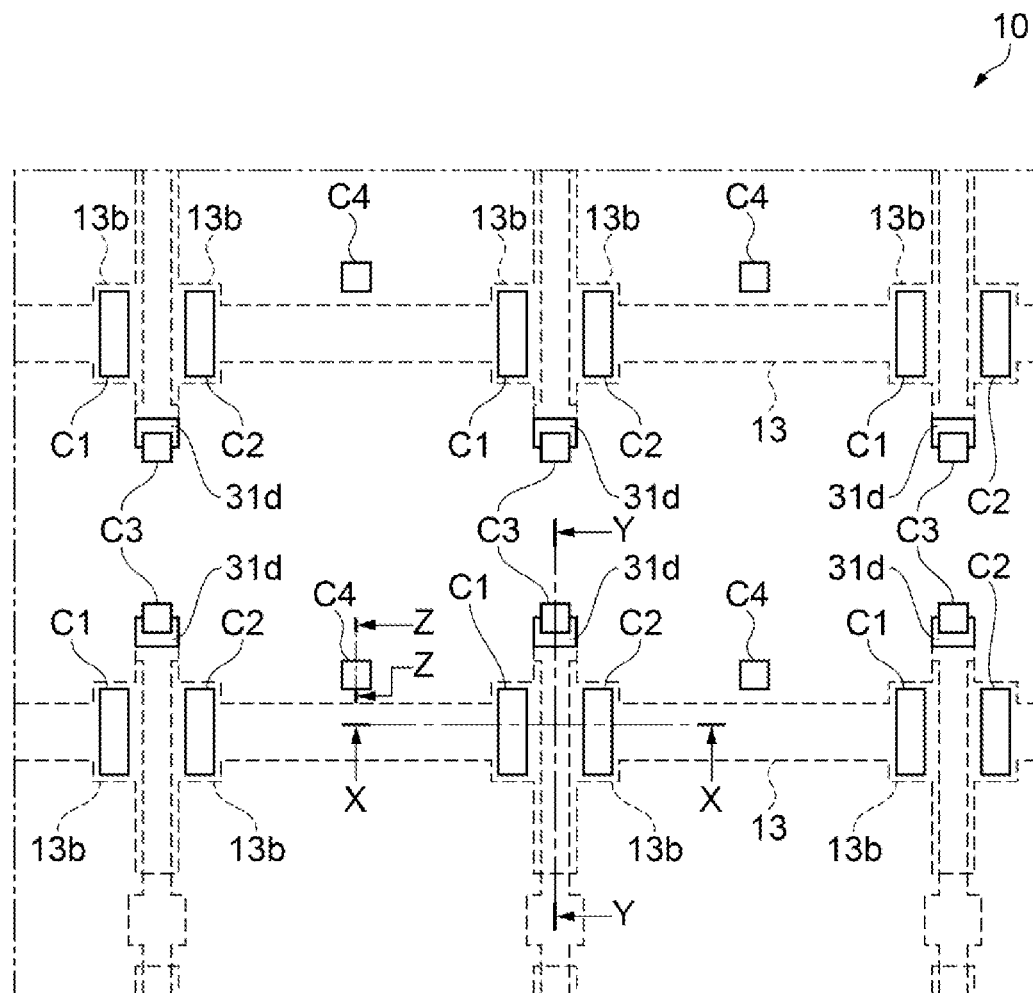
FIG. 17 is a plan view illustrating a mode of pixels in one process for the element substrate.
Figure 17:
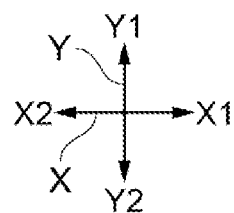
Figure 18A:
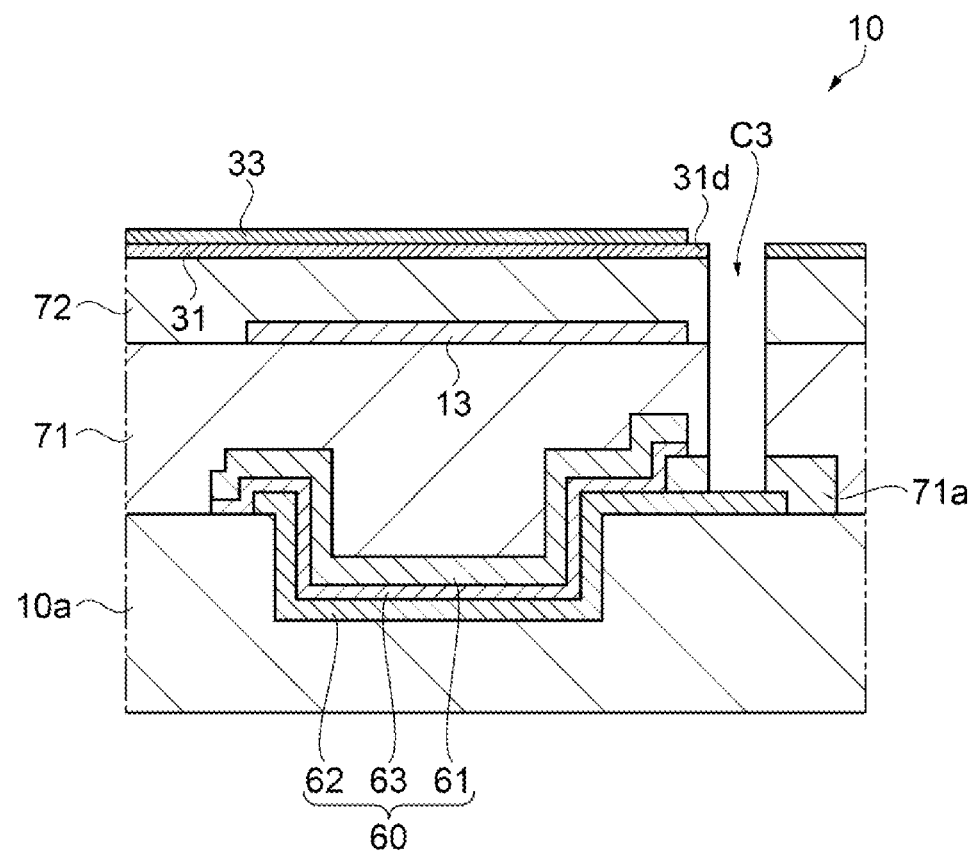
FIG. 18A is a cross-sectional view taken along line Y-Y in FIG. 17.
Figure 18A:
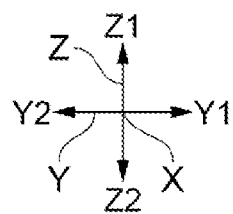
Figure 18B:
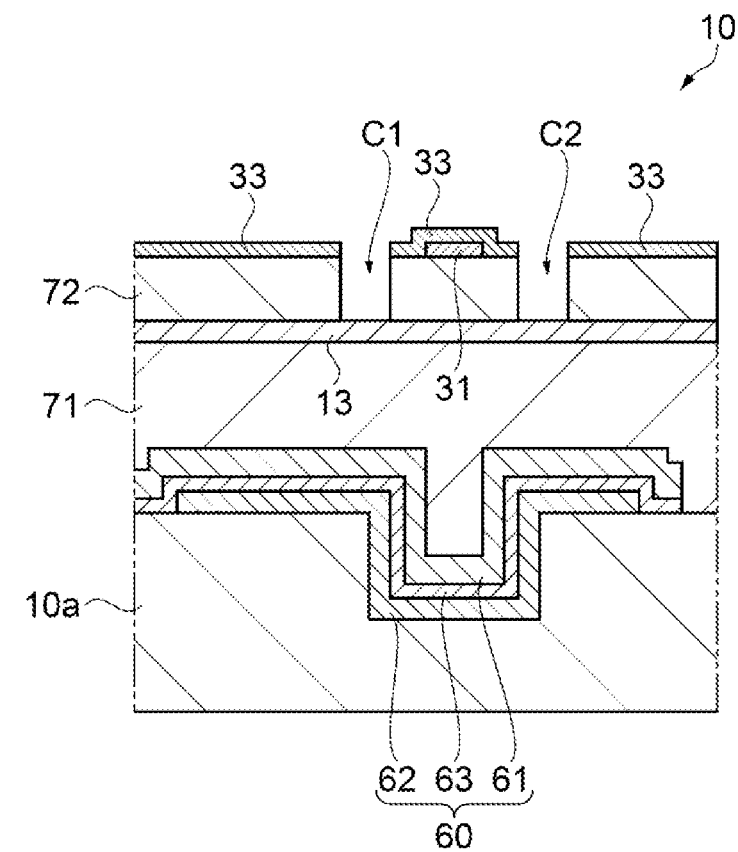
FIG. 18B is a cross-sectional view taken along line X-X in FIG. 17.
Figure 18B:
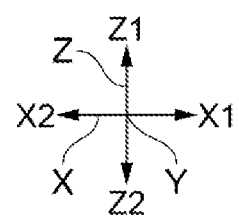
Figure 18C:
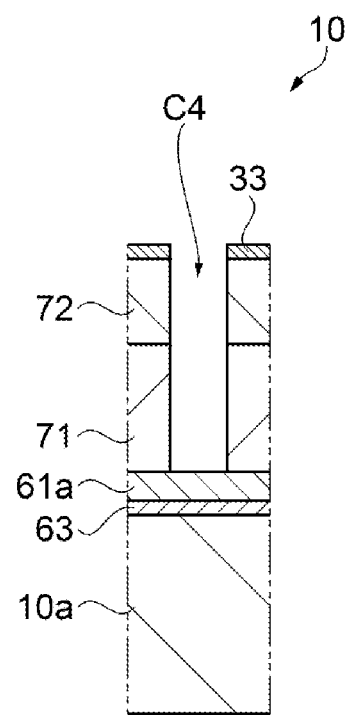
FIG. 18C is a cross-sectional view taken along line Z-Z in FIG. 17.
Figure 18C:
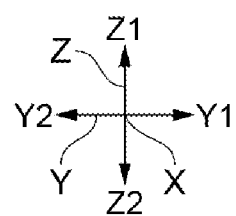

FIG. 17 is a plan view illustrating a mode of pixels in the element substrate in the process in step S6. FIG. 18A is a cross-sectional view taken along line Y-Y in FIG. 17. FIG. 18B is a cross-sectional view taken along line X-X in FIG. 17. FIG. 18C is a cross-sectional view taken along line Z-Z in FIG. 17.

In step S6, first, the gate insulating film 33 is formed at the semiconductor layer 31, then the contact holes C1 and C2 are formed, and thereafter the contact holes C3 and C4 are formed. Specifically, the gate insulating film 33 that is made of a HTO film and has a thickness from 30 nm to 100 nm is formed at the semiconductor layer 31, and then channel doping is selectively performed at the channel of the semiconductor layer 31.

As illustrated in FIGS. 17 and 18B, the contact holes C1 and C2 are disposed on both sides of the channel of the semiconductor layer 31 at positions overlapping the wide portion 13b of the scanning line 13 in plan view, and provided through the gate insulating film 33 and the second interlayer insulating layer 72, to expose the scanning line 13 at the bottom of the contact holes C1 and C2.

As illustrated in FIGS. 17 and 18A, the contact hole C3 is provided through the gate insulating film 33, the second interlayer insulating layer 72, the first interlayer insulating layer 71, and the oxide film island 71a, to expose the second capacitance electrode 62 of the capacitance element 60 at the bottom of the contact hole C3. A drain 31d of the semiconductor layer 31 is exposed inside the contact hole C3. At the entrance of the contact hole C3, part of the gate insulating film 33 covering the drain 31d of the semiconductor layer 31 is removed to expose the drain 31d of the semiconductor layer 31.

As illustrated in FIGS. 17 and 18C, the contact hole C4 is provided through the gate insulating film 33, the second interlayer insulating layer 72, and the first interlayer insulating layer 71, to expose the projecting portion 61a of the first capacitance electrode 61 of the capacitance element 60 at the bottom of the contact hole C4.

The inner walls of the contact hole C4 are inclined at an angle of about 84° with respect to the plane of the substrate 10a. The inner walls of the contact hole C4 can be inclined at a desired angle through adjustment of etching gas. Since the inner walls of the contact hole C4 are inclined at about 84°, the contact hole C4 has a larger size (area) of the hole on the entrance side of the contact hole C4 than the size (area) of the hole on the bottom side. Thus, the shape of the contact hole C4 is an inverted truncated pyramid, an inverted truncated cone, an inverted truncated elliptical cone, or an inverted round-cornered truncated pyramid with rounded corners.

With such a shape of the contact hole C4, the position at which the contact hole C4 is provided in plan view can be brought closer to the scanning line 13 than with the contact hole C4 having a square pole or cylindrical shape when the size of the contact hole C4 on the entrance side is the same.

In the present embodiment, the inclination angle of the inner walls of the contact hole C4 is larger than typical angles. Typically, the inclination angle of the inner walls of the contact holes C4 is about 88°. As described above, in the present embodiment, since the inclination angle of the inner walls of the contact hole C4 is about 84°, which is larger than typical angles, the position at which the contact hole C4 is provided in plan view can be brought closer to the scanning line 13 than typical structures while the clearance between the contact hole C4 and the scanning line 13 is secured.

Furthermore, in the present embodiment, since the inclination angle of the inner walls of the contact hole C4 is larger than typical angles, the clearance between the contact hole C4 and the scanning line 13 can be secured without depending on miniaturization in the photolithography process. Thus, the position at which the contact hole C4 is provided in plan view can be brought closer to the scanning line 13 than in typical structures.

In step S7 in FIG. 6, the gate electrode 32, the second relay electrode 82, and the fifth relay electrode 85 are formed.

Figure 19:
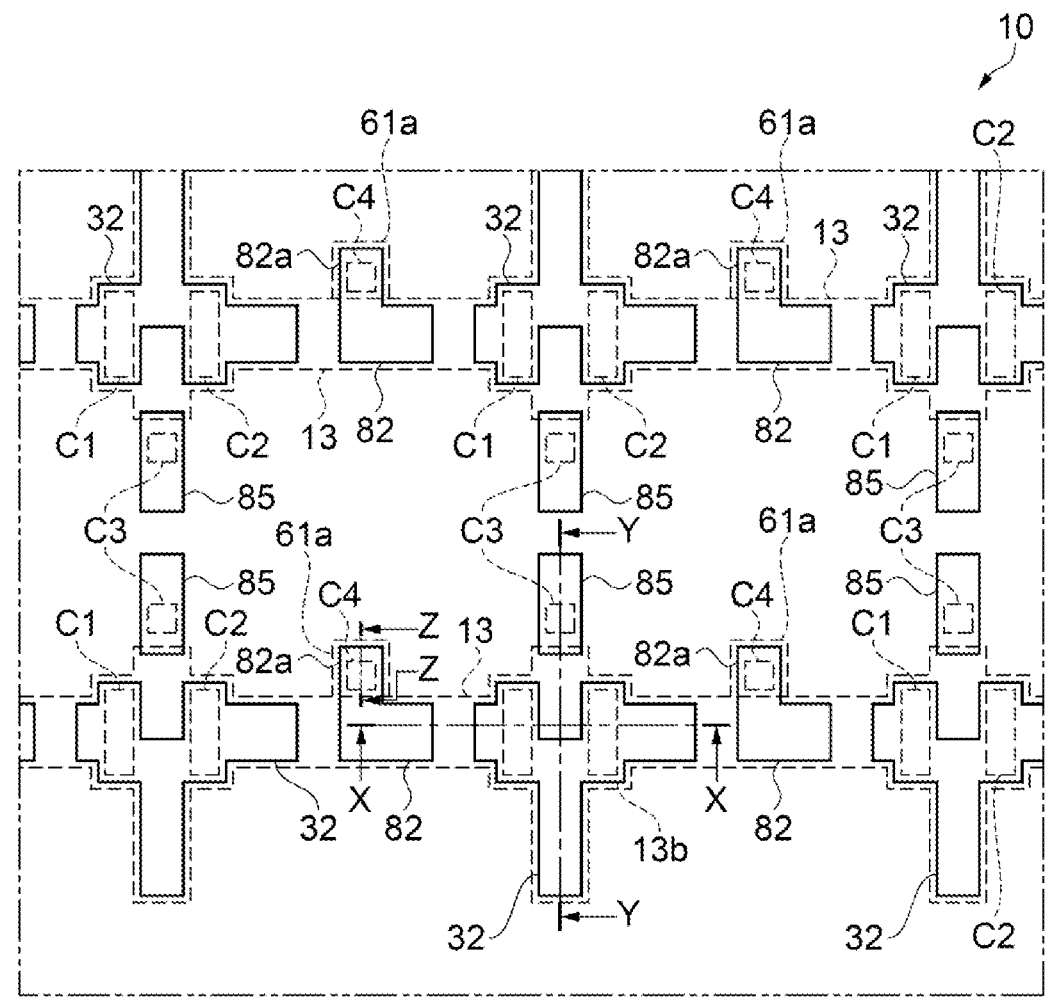
FIG. 19 is a plan view illustrating a mode of pixels in one process for the element substrate.
Figure 19:
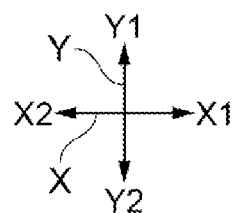
Figure 20A:
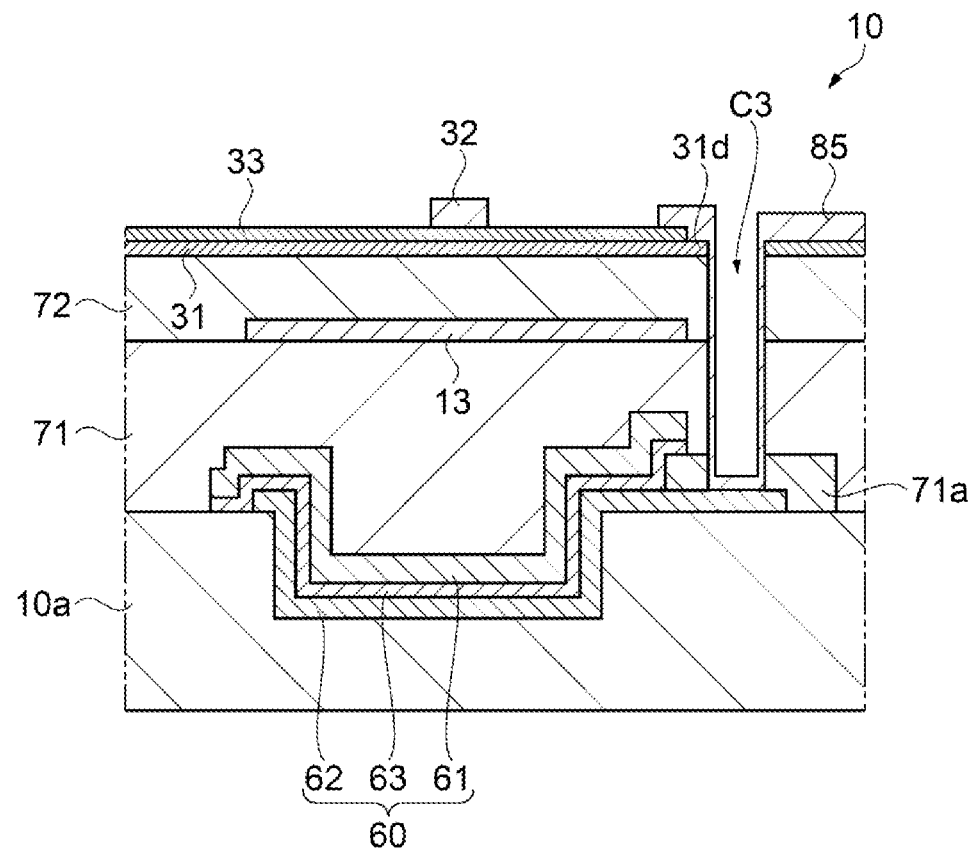
FIG. 20A is a cross-sectional view taken along line Y-Y in FIG. 19.
Figure 20A:
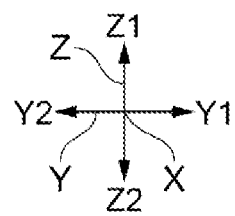
Figure 20B:
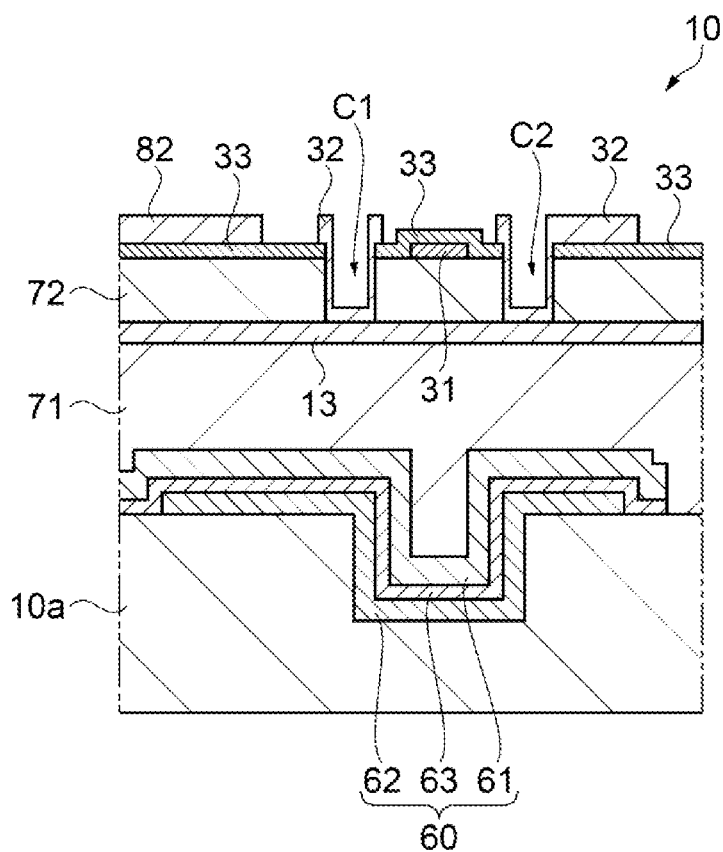
FIG. 20B is a cross-sectional view taken along line X-X in FIG. 19.
Figure 20B:
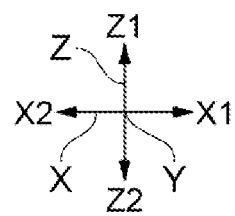
Figure 20C:
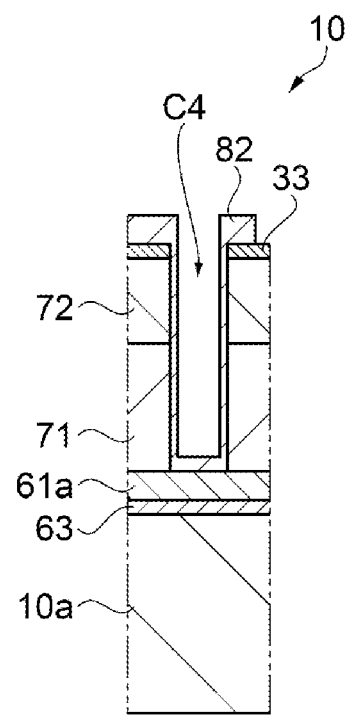
FIG. 20C is a cross-sectional view taken along line Z-Z in FIG. 19.
Figure 20C:
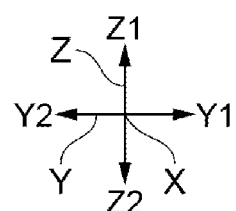

FIG. 19 is a plan view illustrating a mode of pixels in the element substrate in the process in step S7. FIG. 20A is a cross-sectional view taken along line Y-Y in FIG. 19. FIG. 20B is a cross-sectional view taken along line X-X in FIG. 19. FIG. 20C is a cross-sectional view taken along line Z-Z in FIG. 19.

In step S7, the fourth conductive layer having a two layer structure including a conductive polysilicon film and a tungsten silicide film, which is a light shielding conductive film, is formed at the gate insulating film 33 and inside the contact holes C1, C2, C3, and C4.

Since the contact holes C3 and C4 are deep holes having a small diameter, that is, contact holes having a high aspect ratio, a phosphorus-containing deposited polysilicon film is first formed in consideration of adhesion to the inside of the contact holes C3 and C4, and then a tungsten silicide film, which is a light shielding conductive film, is stacked. Thus, the inside of the contact holes C3 and C4 can be covered by the fourth conductive layer in a favorable state.

In step S7, after the fourth conductive layer is formed, the fourth conductive layer is patterned as illustrated in FIG. 19 to form the gate electrode 32, the second relay electrode 82, and the fifth relay electrode 85. As a result, the gate electrode 32 is electrically coupled to the scanning line 13 through the contact holes C1 and C2.

The second relay electrode 82 includes the projecting portion 82a serving as the second protrusion portion projecting from the scanning line 13 in plan view. The projecting portion 82a and the projecting portion 61a protrude from the scanning line 13 and overlap each other in plan view. The second relay electrode 82 and the first capacitance electrode 61 of the capacitance element 60 are electrically coupled to each other through the contact hole C4.

The fifth relay electrode 85 is electrically coupled to the second capacitance electrode 62 of the capacitance element 60 through the contact hole C3.

As described above, the gate electrode 32 is formed at the semiconductor layer 31 and in the contact holes C1 and C2 to surround the semiconductor layer 31 in the Z1 direction, the X1 direction, and the X2 direction, thereby functioning as a light shielding portion of the semiconductor layer 31.

In step S8 in FIG. 6, the light shielding film 50 is formed.

Figure 21:
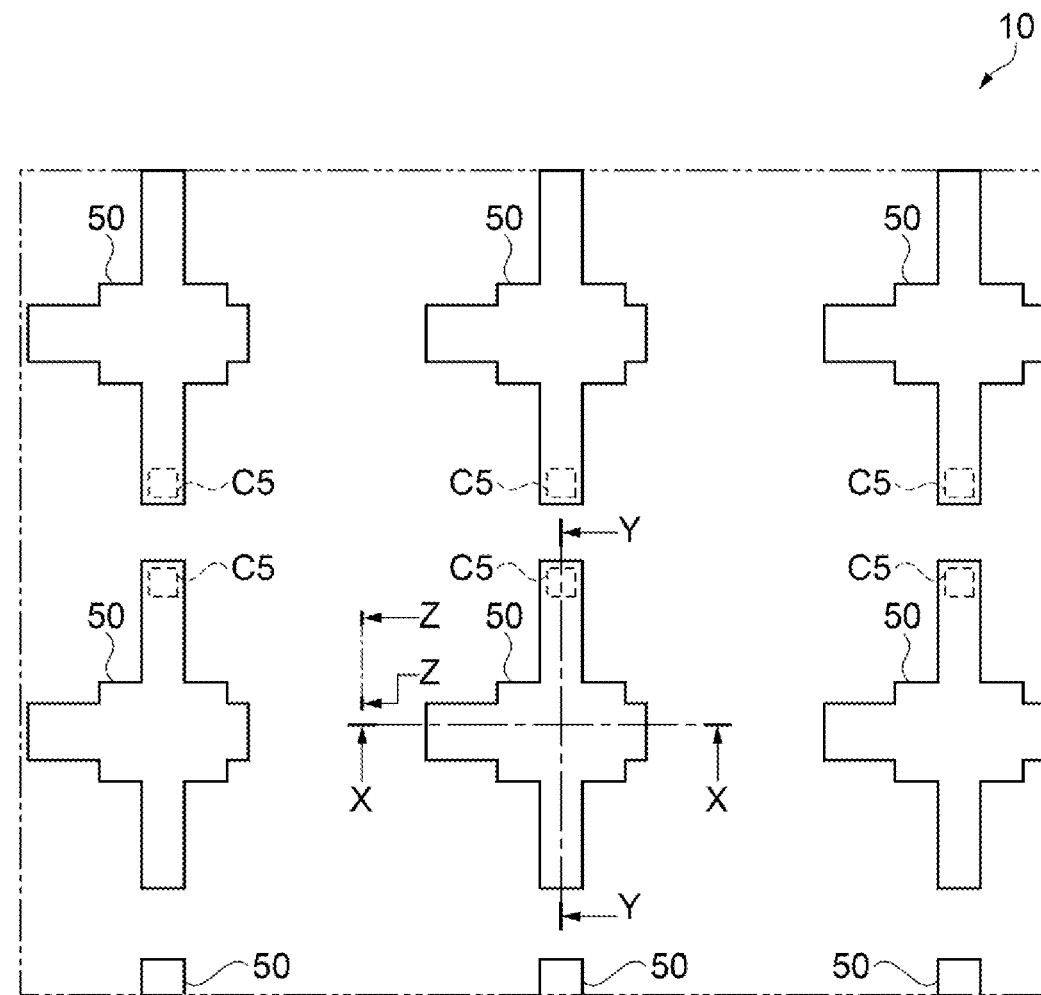
FIG. 21 is a plan view illustrating a mode of pixels in one process for the element substrate.
Figure 21:
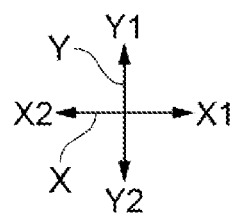
Figure 22A:
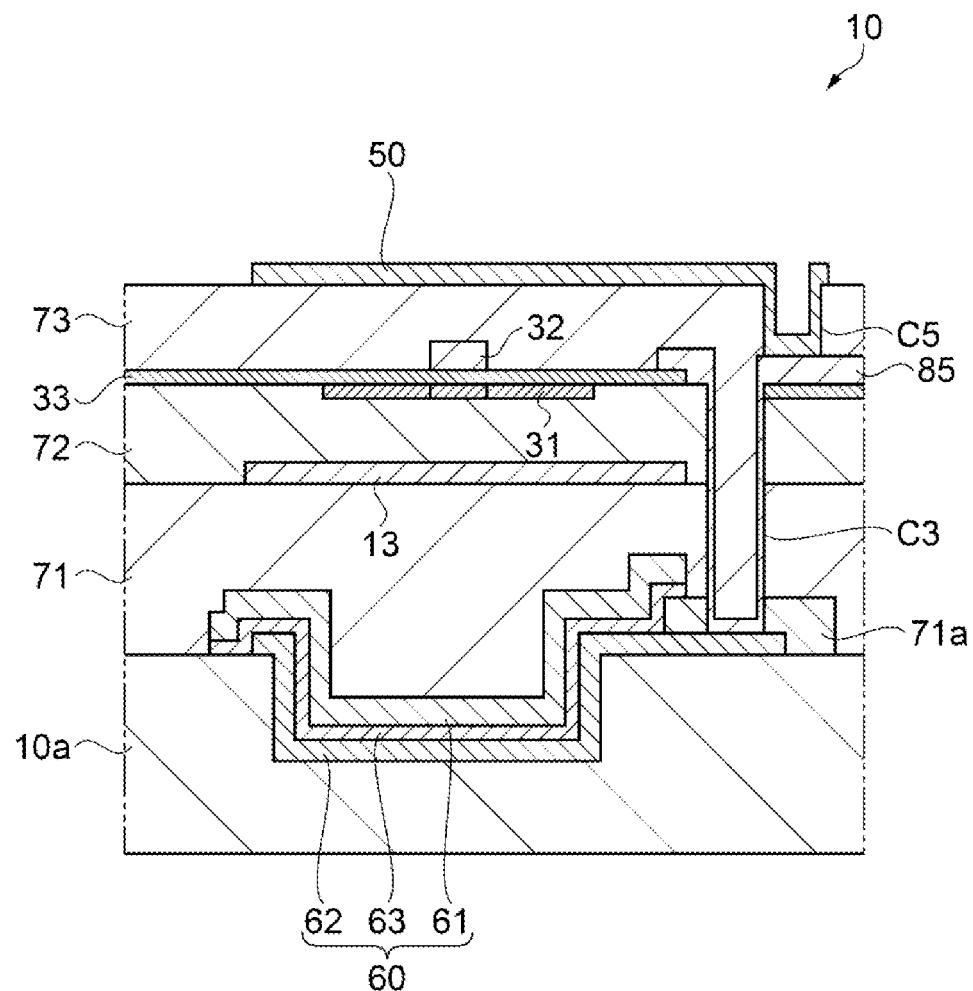
FIG. 22A is a cross-sectional view taken along line Y-Y in FIG. 21.
Figure 22A:
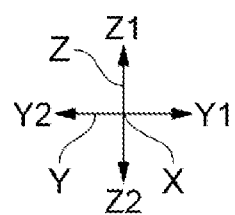
Figure 22B:
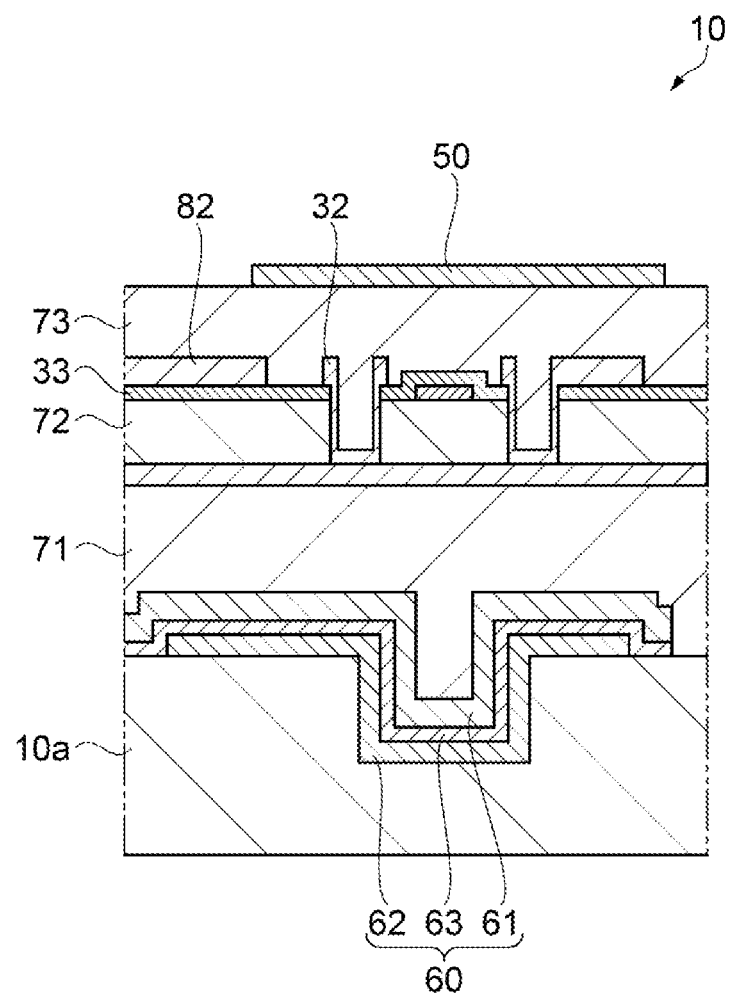
FIG. 22B is a cross-sectional view taken along line X-X in FIG. 21.
Figure 22B:
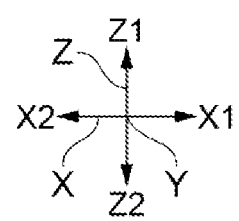

FIG. 21 is a plan view illustrating a mode of pixels in the element substrate in the process in step S8. FIG. 22A is a cross-sectional view taken along line Y-Y in FIG. 21. FIG. 22B is a cross-sectional view taken along line X-X in FIG. 21.

In Step S8, first, the third interlayer insulating layer 73 that is made of a TEOS film and has a thickness from 200 nm to 400 nm is formed at the gate electrode 32, the second relay electrode 82, and the fifth relay electrode 85, and then a contact hole C5 for exposing the fifth relay electrode 85 is formed in the third interlayer insulating layer 73.

In step S8, then, the light shielding film 50 is formed. In the forming of the light shielding film 50, the fifth conductive layer that is made of a metal film such as a tungsten silicide film, which is a light shielding conductive film, and has a thickness from 100 nm to 400 nm is formed at the third interlayer insulating layer 73 and inside the contact hole C5. Thereafter, the fifth conductive layer is patterned as illustrated in FIG. 21, FIG. 22A, and FIG. 22B to form the light shielding film 50.

The light shielding film 50 is electrically coupled to the fifth relay electrode 85 through the contact hole C5. Thus, the light shielding film 50 is electrically coupled to the second capacitance electrode 62 of the capacitance element 60 through the fifth relay electrode 85. The thickness of the light shielding film 50 is about 100 nm. The light shielding film 50 is disposed at a position overlapping the capacitance element 60 in plan view.

Figure 23:
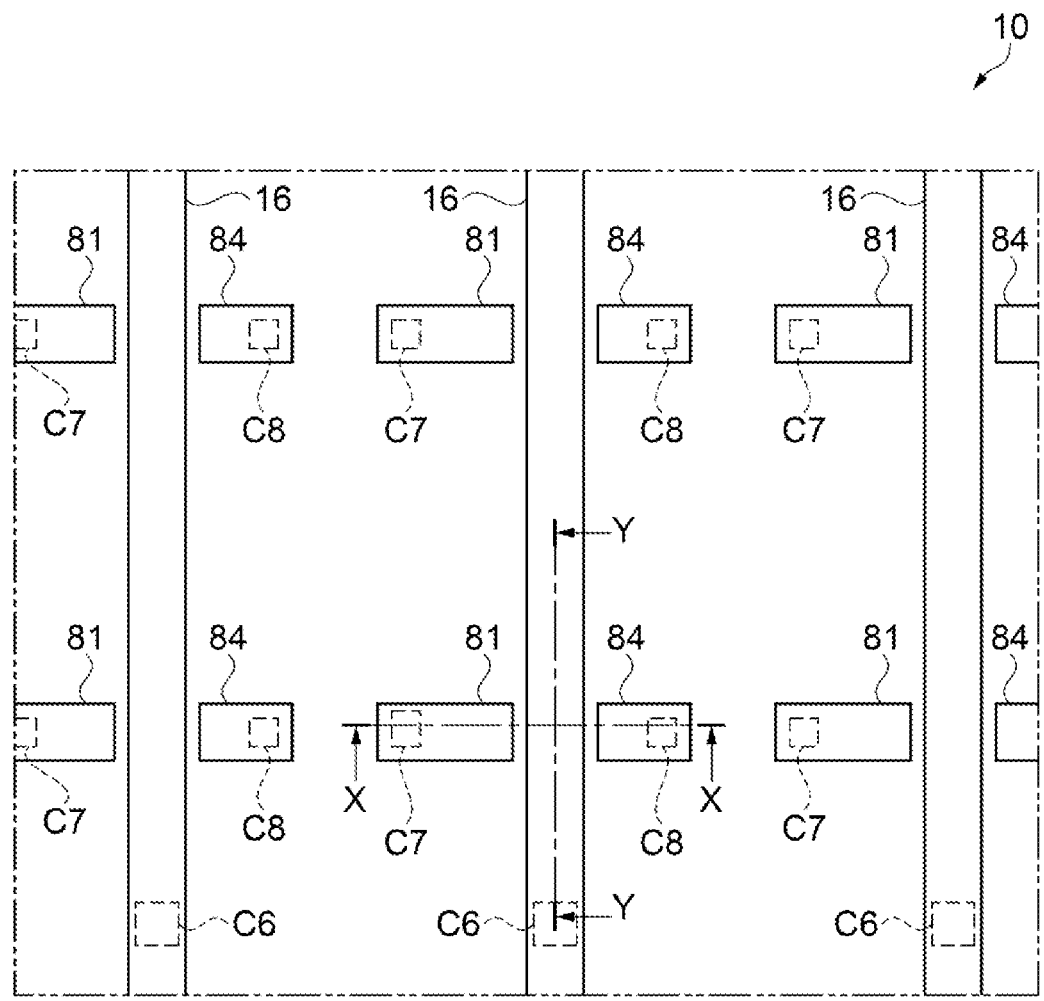
FIG. 23 is a plan view illustrating a mode of pixels in one process for the element substrate.
Figure 23:
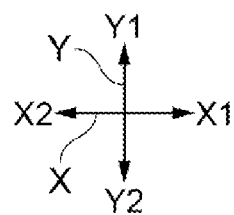
Figure 24A:
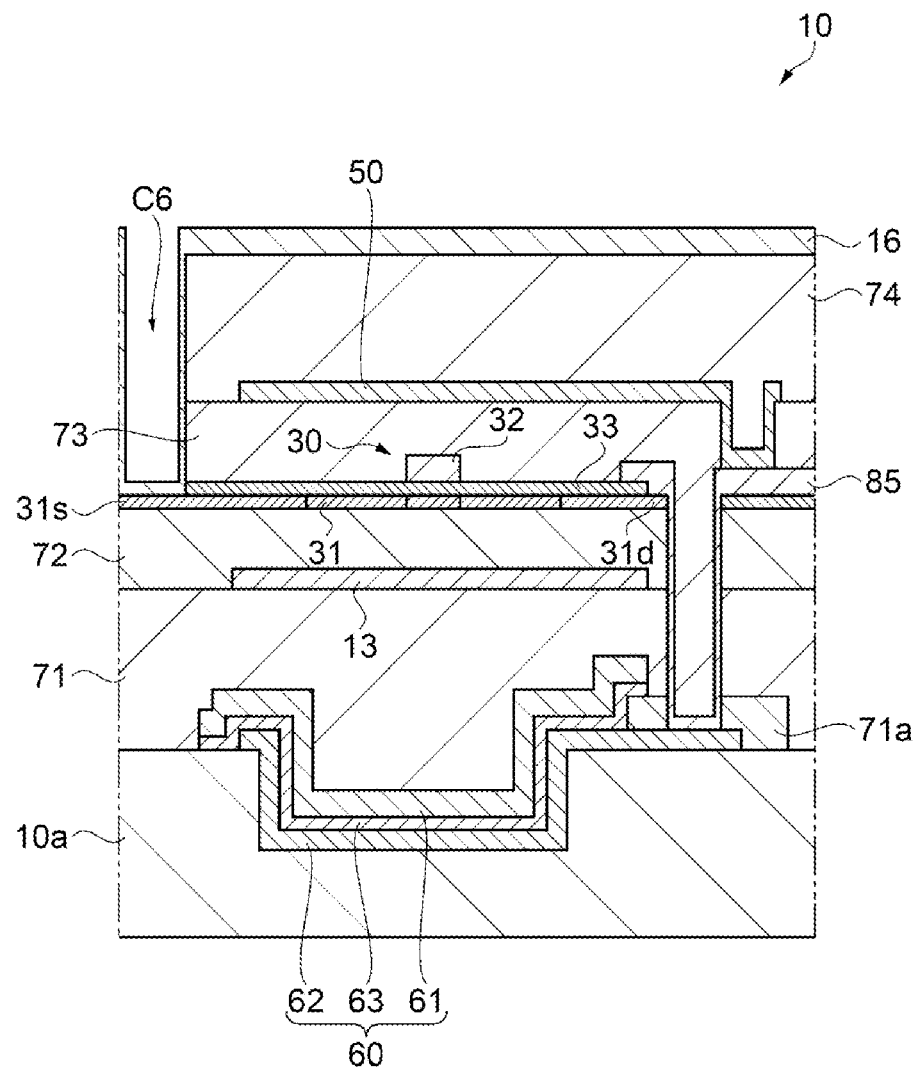
FIG. 24A is a cross-sectional view taken along line Y-Y in FIG. 23.
Figure 24A:
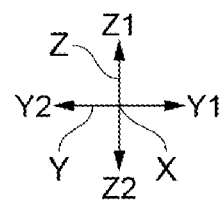
Figure 24B:
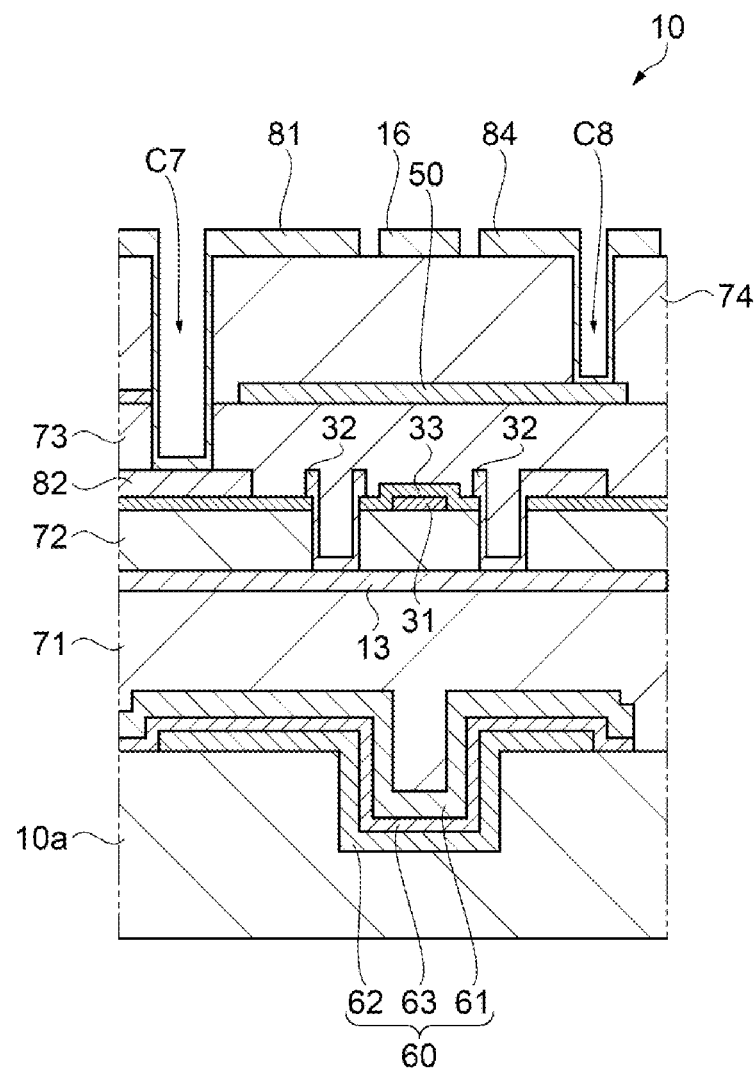
FIG. 24B is a cross-sectional view taken along line X-X in FIG. 23.

In step S9 in FIG. 6, the data line 16 is formed. FIG. 23 is a plan view illustrating a mode of pixels in the element substrate in the process in step S9. FIG. 24A is a cross-sectional view taken along line Y-Y in FIG. 23. FIG. 24B is a cross-sectional view taken along line X-X in FIG. 23.

In Step S9, first, the fourth interlayer insulating layer 74 that is made of a TEOS film and has a thickness from 500 nm to 1000 nm is formed at the light shielding film 50, and then contact holes C6, C7, and C8 are formed.

As illustrated in FIG. 24A, the contact hole C6 is provided through the fourth interlayer insulating layer 74 and the third interlayer insulating layer 73, to expose a source 31s of the TFT 30 at the bottom of the contact hole C6.

As illustrated in FIG. 24B, the contact hole C7 is provided through the fourth interlayer insulating layer 74 and the third interlayer insulating layer 73, to expose the second relay electrode 82 at the bottom of the contact hole C7.

As illustrated in FIG. 24B, the contact hole C8 is provided through the fourth interlayer insulating layer 74, to expose the light shielding film 50 at the bottom of the contact hole C8.

In Step S9, then, the sixth conductive layer made of a multilayer film in which aluminum-alloy films or a titanium nitride film and an aluminum film are stacked in two to four layers is formed at the fourth interlayer insulating layer 74 and inside the contact holes C6, C7, and C8.

In Step S9, after the sixth conductive layer is formed, the sixth conductive layer is patterned as illustrated in FIG. 23 to form the data line 16, the first relay electrode 81, and the fourth relay electrode 84.

As illustrated in FIG. 24A, the data line 16 is formed inside the contact hole C6 and is electrically coupled to the source 31s of the semiconductor layer 31 exposed at the bottom of the contact hole C6.

As illustrated in FIG. 24B, the first relay electrode 81 is formed inside the contact hole C7 and is electrically coupled to the second relay electrode 82 exposed at the bottom of the contact hole C7.

The fourth relay electrode 84 is formed inside the contact hole C8 and is electrically coupled to the light shielding film 50 exposed at the bottom of the contact hole C8.

In step S10 in FIG. 6, the common wiring 18 is formed.

Figure 25:
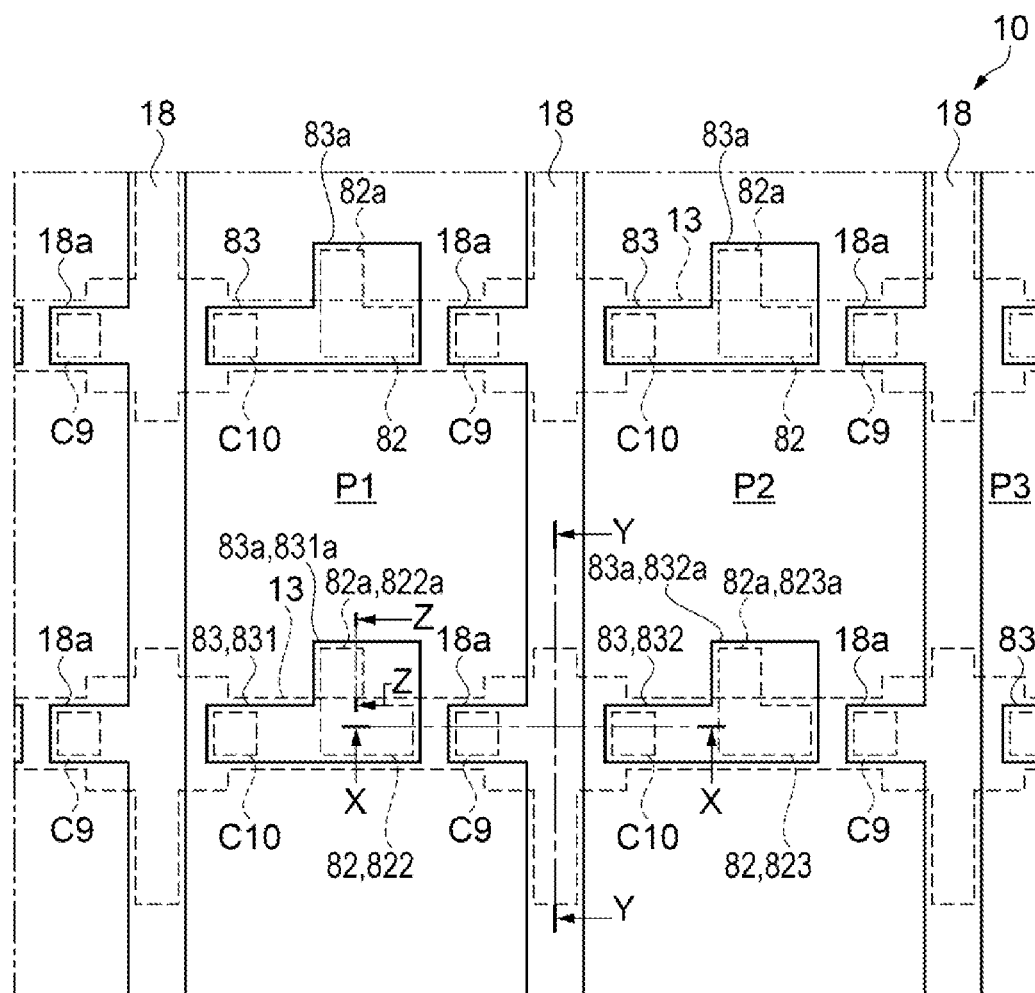
FIG. 25 is a plan view illustrating a mode of pixels in one process for the element substrate.
Figure 26A:
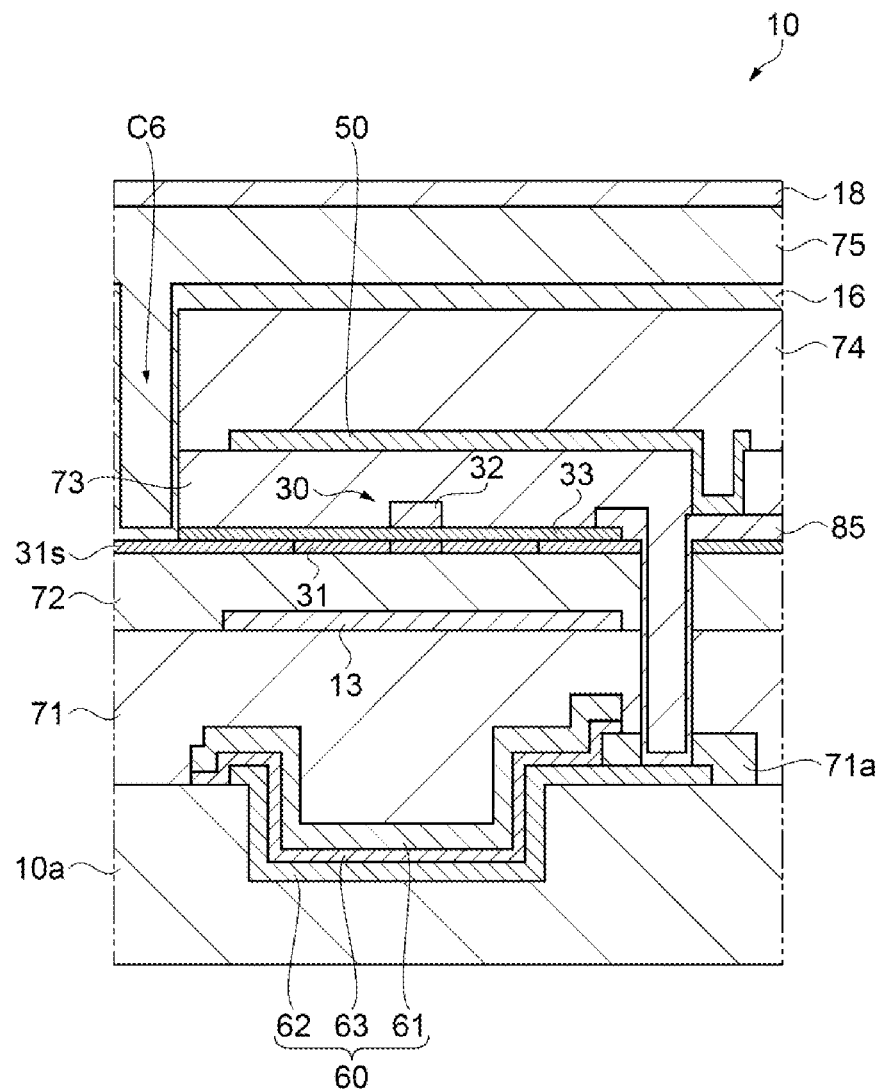
FIG. 26A is a cross-sectional view taken along line Y-Y in FIG. 25.
Figure 26B:
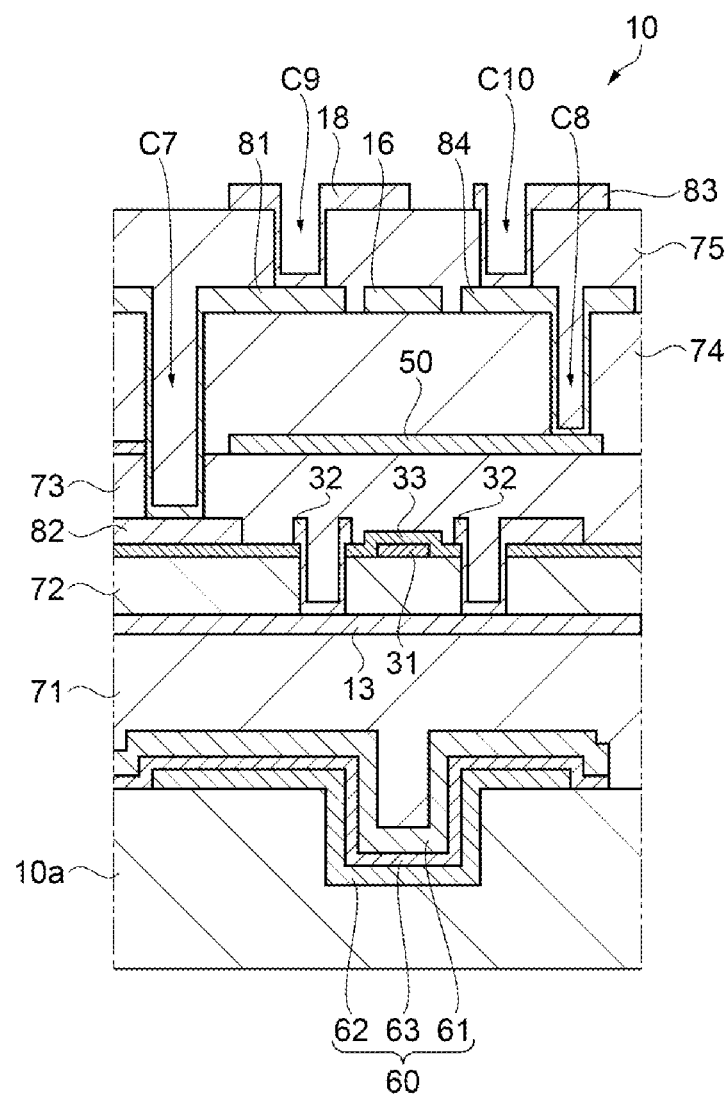
FIG. 26B is a cross-sectional view taken along line X-X in FIG. 25.
Figure 26B:
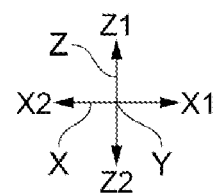
Figure 26C:
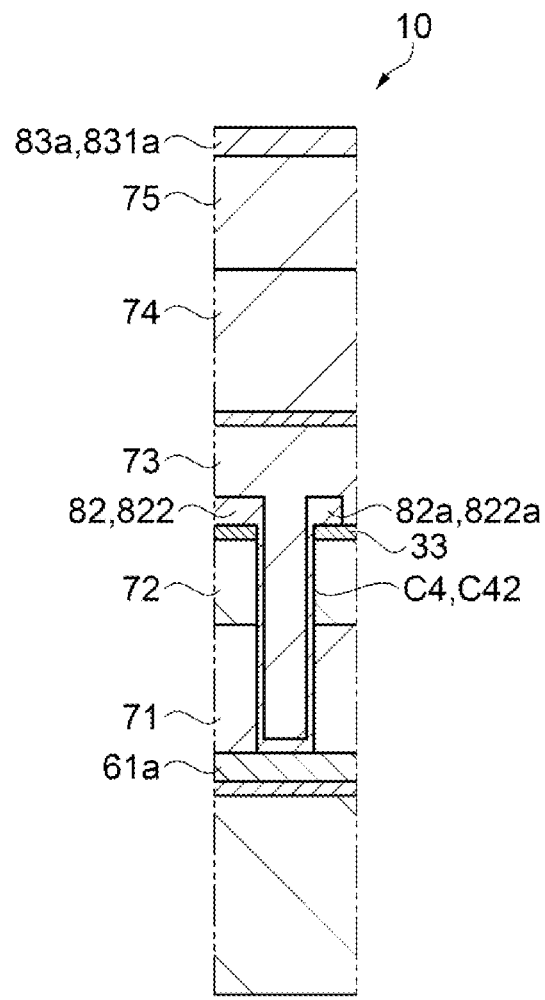
FIG. 26C is a cross-sectional view taken along line Z-Z in FIG. 25.

FIG. 25 is a plan view illustrating a mode of pixels in the element substrate in the process in step S10. FIG. 26A is a cross-sectional view taken along line Y-Y in FIG. 25. FIG. 26B is a cross-sectional view taken along line X-X in FIG. 25. FIG. 26C is a cross-sectional view taken along line Z-Z in FIG. 25.

In Step S10, first, the fifth interlayer insulating layer 75 that is made of a TEOS film and has a thickness from 500 nm to 1000 nm is formed at the data line 16, the first relay electrode 81, and the fourth relay electrode 84.

In step S10, then, contact holes C9 and C10 are formed.

As illustrated in FIG. 25, the contact hole C9 is formed at a position overlapping a projecting portion 18a projecting from the common wiring 18 in the X2 direction in plan view. As illustrated in FIG. 26B, the contact hole C9 is provided through the fifth interlayer insulating layer 75, to expose the first relay electrode 81 at the bottom of the contact hole C9.

As illustrated in FIG. 25, the contact hole C10 is formed in the X1 direction of the common wiring 18. As illustrated in FIG. 26B, the contact hole C10 is provided through the fifth interlayer insulating layer 75, to expose the fourth relay electrode 84 at the bottom of the contact hole C10.

In the step S10, then, the seventh conductive layer made of a multilayer film in which aluminum-alloy films or a titanium nitride film and an aluminum film are stacked in two to four layers is formed at the fifth interlayer insulating layer 75 and inside the contact holes C9 and C10.

In the step S10, after the seventh conductive layer is formed, the seventh conductive layer is patterned as illustrated in FIG. 25 to form the common wiring 18 serving as the capacitance wiring and the third relay electrode 83 serving as the first conductive member.

As illustrated in FIGS. 25, 26A, and 4, the common wiring 18 is formed at a position overlapping the data line 16 in plan view and in cross-sectional view. As illustrated in FIG. 26B, the common wiring 18 is formed inside the contact hole C9 and is electrically coupled to the first relay electrode 81 exposed at the bottom of the contact hole C9.

As illustrated in FIG. 25, the third relay electrode 83 is disposed between two lines of the common wiring 18.

The third relay electrode 83 includes a projecting portion 83a projecting from the scanning line 13 in the Y1 direction in plan view. The planar size of the projecting portion 83a is larger than that of the projecting portion 82a of the second relay electrode 82. The planar size of the projecting portion 83a may be the same as that of the projecting portion 82a of the second relay electrode 82.

As described above, the projecting portion 831a of the third relay electrode 831 of the pixel P1 overlaps the projecting portion 822a of the second relay electrode 822 of the pixel P2 in plan view. The projecting portion 832a of the third relay electrode 832 of the pixel P2 overlaps the projecting portion 823a of the second relay electrode 823 of the pixel P3 in plan view.

As illustrated in FIG. 26B, the third relay electrode 83 is formed inside the contact hole C10 and is electrically coupled to the fourth relay electrode 84 exposed at the bottom of the contact hole C10.

In step S11 in FIG. 6, the pixel electrode 11 is formed.

Figure 27:
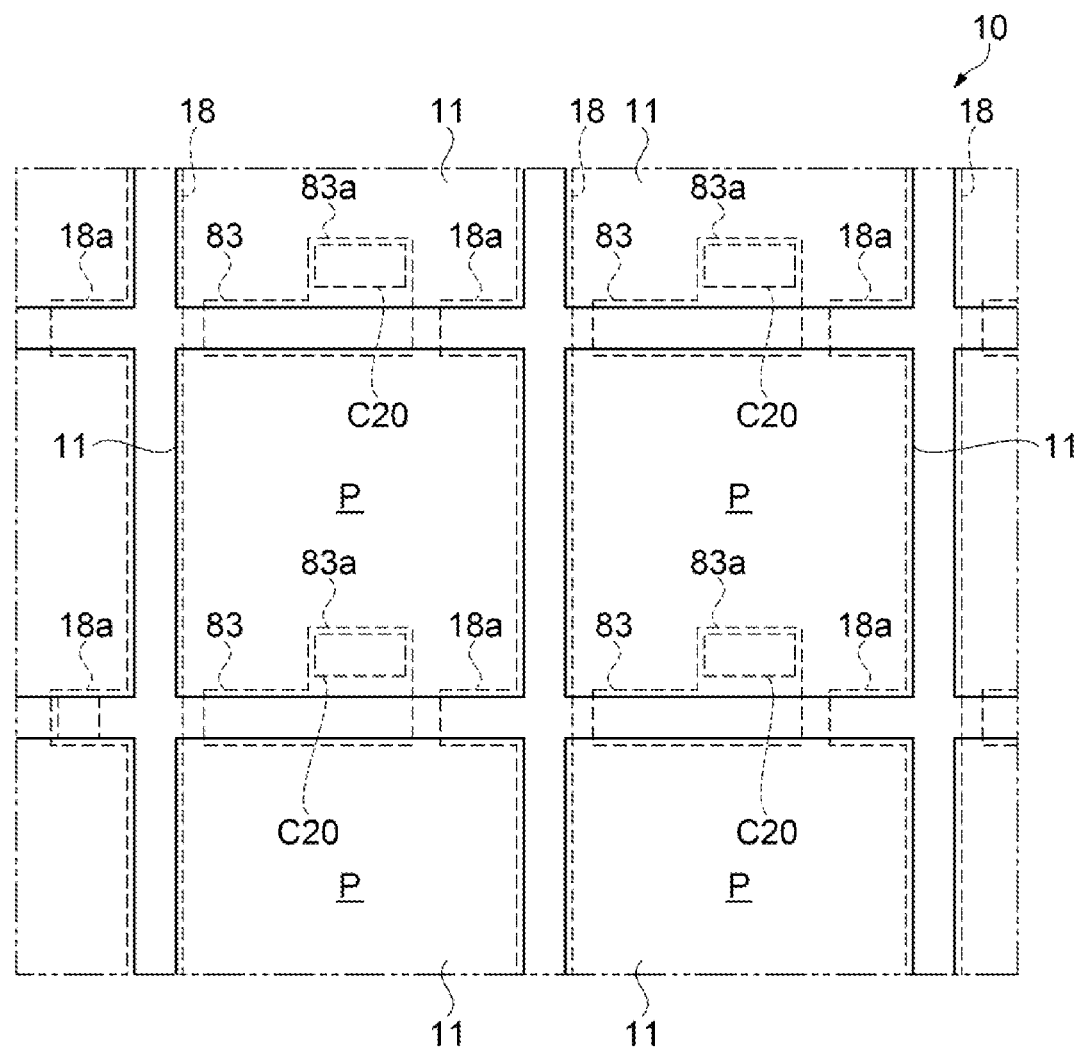
FIG. 27 is a plan view illustrating a mode of pixels in one process for the element substrate.
Figure 27:
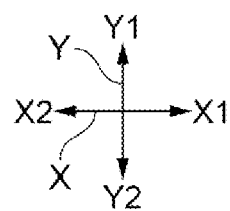

FIG. 27 is a plan view illustrating a mode of pixels in the element substrate in the process in step S11.

In Step S11, as illustrated in FIGS. 5A, 5B, and 5C, first, the sixth interlayer insulating layer 76 that is made of a TEOS film and has a thickness from 500 nm to 1000 nm is formed at the common wiring 18 and the third relay electrode 83.

In Step S11, then, the contact hole C20 is formed.

As illustrated in FIGS. 27 and 5C, the contact hole C20 is formed at a position overlapping the projecting portion 83a of the third relay electrode 83 in plan view. The contact hole C20 is provided through the sixth interlayer insulating layer 76, to expose the third relay electrode 83 at the bottom of the contact hole C20.

Note that the contact hole C20 is provided in the shape of an inverted truncated pyramid or an inverted round-cornered truncated pyramid. As for the dimensions of the contact hole C20, the entrance portion of the hole, that is, the side provided with the pixel electrode 11 has a long side of 1.2 µm and a short side of 0.5 µm. The dimensions of the bottom portion of the hole are 0.4 µm for both the long and short sides.

In Step S11, then, an ITO film is formed at the sixth interlayer insulating layer 76 and inside the contact hole C20 and is patterned to form the pixel electrode 11 for each pixel P.

As described above, with the liquid crystal apparatus 100 that is the electro-optical device of the present embodiment, the following advantages can be achieved.

The liquid crystal apparatus 100 of the present embodiment includes the substrate 10a serving as a substrate, the TFT 301 for the pixel P1 serving as a first transistor, the TFT 302 for the pixel P2 serving as a second transistor adjacent to the TFT 301 in the first direction, the scanning line 13 serving as a light shielding member provided along the first direction between the substrate 10a and the TFT 301 and between the substrate 10a and the TFT 302 for the pixel P2, the common wiring 18 serving as capacitance wiring, the pixel electrode 111 of the pixel P1 provided corresponding to the TFT 301, the third relay electrode 831 of the pixel P1 serving as a first conductive member including the projecting portion 831a serving as a first protrusion portion overlapping the scanning line 13 in plan view and protruding from the scanning line 13, the third relay electrode 831 electrically coupling the TFT 301 and the pixel electrode 111, the capacitance element 602 provided between the substrate 10a and the scanning line 13 and overlapping the TFT 302 in plan view, and the second relay electrode 822 of the pixel P2 serving as a second conductive member including the projecting portion 822a serving as a second protrusion portion overlapping the scanning line 13 in plan view and protruding from the scanning line 13, the second relay electrode 822 electrically coupling the capacitance element 602 and the common wiring 18. The contact hole C201 serving as a first contact hole for electrically coupling the pixel electrode 111 and the third relay electrode 831 overlaps the contact hole C42 serving as a second contact hole for electrically coupling the capacitance element 602 and the second relay electrode 822 in plan view.

Thus, in the liquid crystal apparatus 100 of the present embodiment, the pixel electrode 111 and the third relay electrode 831 of the pixel P1 are electrically coupled to each other through the contact hole C201 provided between the pixel electrode 111 and the projecting portion 831a, the capacitance element 602 and the second relay electrode 822 are coupled to each other through the contact hole C42 provided between the capacitance element 602 and the projecting portion 822a, and the contact hole C201 of the pixel P1 and the contact hole C42 of the pixel P2 overlap each other in plan view.

Thus, since the capacitance element 60 is coupled to the common wiring 18 for each pixel P, the potential of the first capacitance electrode 61 coupled to the common wiring 18 is stabilized, whereby defects such as unevenness in display can be suppressed.

Furthermore, the portion of the pixel electrode 111 overlapping the contact hole C201 is recessed and is thus unlikely to contribute to display. The contact hole C42, which is provided at a position protruding from the scanning line 13, may adversely affect transmittance. However, by providing the contact hole C42 at a position overlapping the contact hole C201 in plan view, adverse effects on display can be minimized.

Note that the light shielding member is not limited to the scanning line 13. For example, the light shielding member may be a signal line other than the scanning line 13, or a light shielding film provided in a wiring shape or an island shape.

Furthermore, in the liquid crystal apparatus 100 of the present embodiment, the third relay electrode 83 serving as the first conductive member and the common wiring 18 serving as the capacitance wiring are provided in the same layer.

Thus, in the liquid crystal apparatus 100 of the present embodiment, since the third relay electrode 83 is provided in the seventh conductive layer, which is the same layer as the common wiring 18, it is possible to facilitate the layout of the third relay electrode 83 and to improve the utilization rate of the seventh conductive layer. In addition, since the seventh conductive layer is a conductive layer immediately below the pixel electrode 11, it is possible to prevent the contact hole C20 from becoming a deep hole or a hole having a high aspect ratio, and thus it is possible to satisfactorily perform electrical coupling between the pixel electrode 11 and the third relay electrode 83.

Furthermore, in the liquid crystal apparatus 100 of the present embodiment, the area of the projecting portion 83a of the third relay electrode 83 serving as the first protrusion portion is equal to or larger than the area of the projecting portion 82a of the second relay electrode 82 serving as the second protrusion portion in plan view.

Thus, in the liquid crystal apparatus 100 of the present embodiment, by setting the size of the projecting portion 83a of the third relay electrode 83 on the pixel electrode 11 side to be equal to or larger than the size of the projecting portion 82a of the second relay electrode 82, the projecting portion 82a of the second relay electrode 82 can be disposed so as to completely overlap the projecting portion 83a of the third relay electrode 83 in plan view, whereby it is possible to minimize adverse effects on display.

Furthermore, in the liquid crystal apparatus 100 of the present embodiment, the third relay electrode 83 serving as the first conductive member includes a layer containing aluminum, and the second relay electrode 82 serving as the second conductive member includes a layer containing the polysilicon and a layer containing tungsten silicide.

Thus, in the liquid crystal apparatus 100 of the present embodiment, since the third relay electrode 83 includes the layer containing aluminum, the influence of the second relay electrode 82 including the layer containing polysilicon having transparency and the layer containing tungsten silicide can be hidden by the third relay electrode 83 having light shielding property.

Furthermore, in the liquid crystal apparatus 100 of the present embodiment, the length of the long side of the contact hole C20 serving as the first contact hole on the pixel electrode 11 side is equal to or larger than the length of the long side of the contact hole C20 on the projecting portion 83a side serving as the first protrusion portion.

Thus, in the liquid crystal apparatus 100 of the present embodiment, the shape of the hole of the contact hole C20 is made such that the size of the hole on the pixel electrodes 11 side, which is on the entrance side of the contact hole C20, is larger than the size of the hole on the bottom side of the contact hole C20, whereby the recess of the pixel electrode 11 can be made gentle and the influence on display can be suppressed.

Furthermore, in the liquid crystal apparatus 100 of the present embodiment, part of the capacitance element 60 is provided inside the trench 10c serving as a groove provided in the substrate 10a.

Thus, in the liquid crystal apparatus 100 of the present embodiment, since the capacitance element 60 has a portion provided inside the trench 10c, unevenness in thickness, cracks, and the like are likely to occur in the first capacitance electrode 61 of the capacitance element 60. However, even if the resistance of the first capacitance electrode 61 becomes high due to thickness unevenness or cracks of the first capacitance electrode 61, since the first capacitance electrode 61 is electrically coupled to the common wiring 18, defects such as unevenness in display can be suppressed.

The liquid crystal apparatus 100 of the present embodiment includes the substrate 10a serving as a substrate, the TFT 30 serving as a transistor, the scanning line 13 serving as a light shielding member provided along the first direction between the substrate 10a and the TFT 30, the common wiring 18 serving as capacitance wiring, the pixel electrode 11 provided corresponding to the TFT 30, the third relay electrode 83 serving as a first conductive member including the projecting portion 83a serving as a first protrusion portion overlapping the scanning line 13 in plan view and protruding from the scanning line 13, the third relay electrode 83 electrically coupling the TFT 30 and the pixel electrode 11, the capacitance element 60 provided between the substrate 10a and the scanning line 13, and the second relay electrode 82 serving as a second conductive member including the projecting portion 82a serving as a second protrusion portion overlapping the scanning line 13 in plan view and protruding from the scanning line 13, the second relay electrode 82 electrically coupling the capacitance element 60 and the common wiring 18. The contact hole C20 serving as a first contact hole for electrically coupling the pixel electrode 11 and the third relay electrode 83 overlaps the contact hole C4 serving as a second contact hole for electrically coupling the capacitance element 60 and the second relay electrode 82 in plan view.

Thus, in the liquid crystal apparatus 100 of the present embodiment, the pixel electrode 11 and the third relay electrode 83 are electrically coupled to each other through the contact hole C20 provided between the pixel electrode 11 and the projecting portion 83a, the capacitance element 60 and the second relay electrode 82 are coupled to each other through the contact hole C4 provided between the capacitance element 60 and the projecting portion 82a serving as the second protrusion portion, and the contact hole C20 and the contact hole C4 overlap each other in plan view.

With this configuration, since the capacitance element 60 is coupled to the common wiring 18 for each pixel P, the potential of the first capacitance electrode 61 coupled to the common wiring 18 is stabilized, whereby defects such as unevenness in display can be suppressed.

Furthermore, the portion of the pixel electrode 11 overlapping the contact hole C20 is recessed and is thus unlikely to contribute to display. The contact hole C4, which is provided at a position protruding from the scanning line 13, may adversely affect transmittance. However, by providing the contact hole C4 at a position overlapping the contact hole C20 in plan view, adverse effects on display can be minimized.

Note that the light shielding member is not limited to the scanning line 13. For example, the light shielding member may be a signal line other than the scanning line 13, or a light shielding film provided in a wiring shape or an island shape. The contact hole C20 and the contact hole C4 may be included in the same pixel P. For example, by disposing the capacitance element 60 in the same pixel P, the contact hole C20 and the contact hole C4 can be included in the same pixel P.

2. Second Embodiment 2.1. Overview of Display Apparatus

Figure 28:
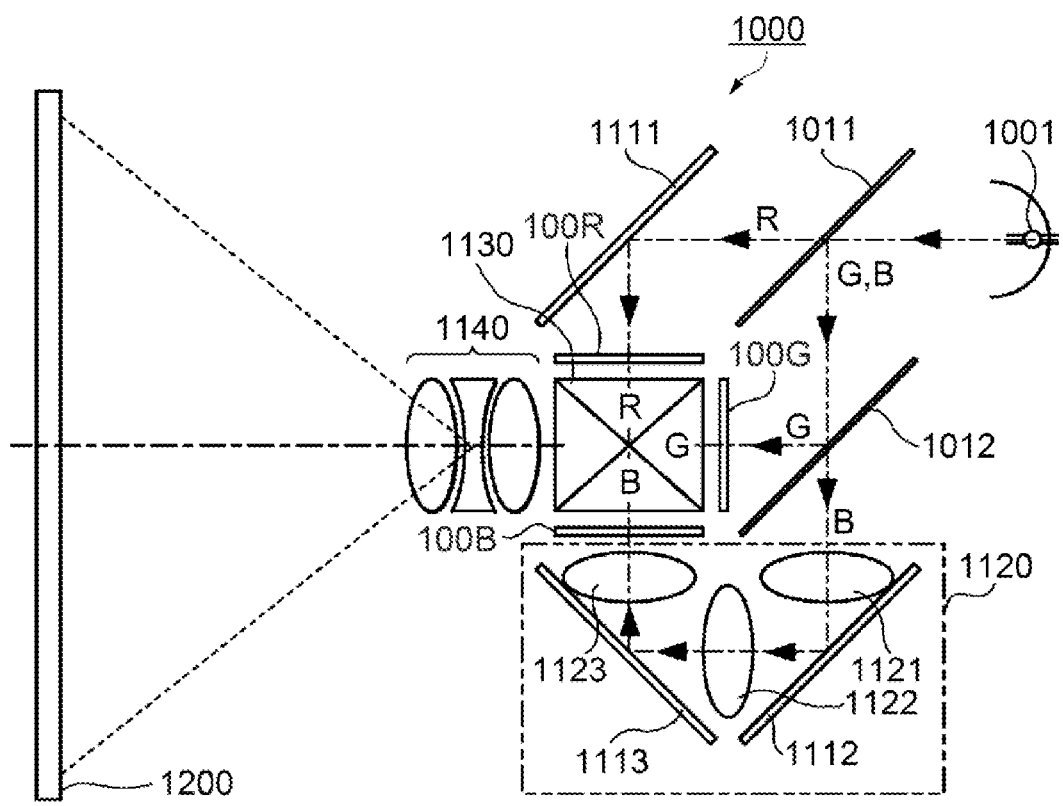
FIG. 28 is a schematic configuration view illustrating a projection-type display apparatus according to a second embodiment.

FIG. 28 is a schematic configuration view illustrating a configuration of a projection-type display apparatus that is a display apparatus according to the present embodiment. In the present embodiment, a projection-type display apparatus 1000 is described as an example of a display apparatus including the liquid crystal apparatus 100 that is the electro-optical device described above.

As illustrated in FIG. 28, the projection-type display apparatus 1000 that is the display apparatus of the present embodiment includes a lamp unit 1001 serving as a light source, dichroic mirrors 1011 and 1012 serving as a color separation optical system, a liquid crystal apparatus 100B corresponding to blue light, a liquid crystal apparatus 100G corresponding to green light, and a liquid crystal apparatus 100R corresponding to red light, three reflection mirrors 1111, 1112, and 1113, three relay lenses 1121, 1122, and 1123, a dichroic prism 1130 serving as a color combining optical system, and a projection lens 1140 serving as a projection optical system.

The lamp unit 1001 employs, for example, a discharging type light source. The type of the light source is not limited to this, and a solid state light source such as a light emitting diode or a laser may be employed.

A light beam emitted from the lamp unit 1001 is separated by the two dichroic mirrors 1011 and 1012 into light beams of three colors in different wavelength regions. The light beams of three colors are a red light beam R, a green light beam G, and a blue light beam B.

The dichroic mirror 1011 transmits the red light beam R, and reflects the green light beam G and the blue light beam B with wavelengths shorter than that of the red light beam R. The red light beam R that has transmitted through the dichroic mirror 1011 is reflected by the reflection mirror 1111 to be incident on the liquid crystal apparatus 100R. The green light beam G reflected by the dichroic mirror 1011 is reflected by the dichroic mirror 1012 to be incident on the liquid crystal apparatus 100G. The blue light beam B reflected by the dichroic mirror 1011 transmits through the dichroic mirror 1012 to be emitted to a relay lens system 1120.

The relay lens system 1120 includes the relay lenses 1121, 1122, and 1123 and the reflection mirrors 1112 and 1113. The blue light beam B is likely to have a large light flux because the optical path thereof is longer than those of the green light beam G and the red light beam R. Thus, the relay lens 1122 is used to suppress the expansion of the light flux of the blue light beam B. The blue light beam B incident on the relay lens system 1120 is reflected by the reflection mirror 1112, and is converged by the relay lens 1121 in the vicinity of the relay lens 1122. The blue light beam B is made incident on the liquid crystal apparatus 100B through the reflection mirror 1113 and the relay lens 1123.

The liquid crystal apparatus 100 that is the electro-optical device according to the first embodiment is applied as the liquid crystal apparatuses 100R, 100G, and 100B serving as light modulation devices in the projection-type display apparatus 1000.

Each of the liquid crystal apparatuses 100R, 100G, and 100B is electrically coupled to an upper circuit of the projection-type display apparatus 1000. With this configuration, an image signal Dx designating the gradation level of the red light beam R, the green light beam G, and the blue light beam B is supplied from an external circuit, and is processed by the upper circuit. Then, the liquid crystal apparatuses 100R, 100G, and 100B are driven, and the respective color light beams are modulated.

The red light beam R, the green light beam G, and the blue light beam B modulated by the liquid crystal apparatuses 100R, 100G, and 100B are incident on the dichroic prism 1130 from three directions. The dichroic prism 1130 combines the red light beam R, the green light beam G, and the blue light beam B incident thereon. The red light beam R and the blue light beam B are reflected by the dichroic prism 1130 at an angle of 90 degrees, whereas the green light beam G transmits through the dichroic prism 1130. As a result, the red light beam R, the green light beam G, and the blue light beam B are combined into display light for displaying a color image to be emitted toward the projection lens 1140.

The projection lens 1140 is disposed facing the outer side of the projection-type display apparatus 1000. The display light is expanded and emitted through the projection lens 1140 to be projected onto a screen 1200 that is the projection target.

In the present embodiment, the projection-type display apparatus 1000 is described as an example of the display apparatus, but the display apparatus to which the liquid crystal apparatus 100 is applied is not limited to this. For example, the liquid crystal apparatus may be applied to display apparatuses such as a projection type head-up display (HUD), a head mounted display (HMD), a personal computer, a digital camera, or a liquid crystal television.

With the projection-type display apparatus 1000 of the present embodiment as described above, the following advantages can be achieved in addition to those achieved by the embodiments described above.

The projection-type display apparatus 1000 that is a display apparatus preferably includes the liquid crystal apparatus 100 that is the electro-optical device according to the embodiments described above.

With this configuration, since miniaturization or high definition of the liquid crystal apparatus 100 mounted on the projection-type display apparatus 1000 can be achieved, miniaturization of the projection-type display apparatus 1000 including the liquid crystal apparatus 100 mounted thereon can be achieved. Since high definition display can be achieved without increasing the size of the projection-type display apparatus 1000, an excellent display apparatus can be provided.

In the embodiments described above, a transmissive liquid crystal apparatus is described as an example of the liquid crystal apparatus 100 that is the electro-optical device, but the liquid crystal apparatus 100 may be a reflective liquid crystal apparatus or a liquid crystal on silicon (LCOS)-type liquid crystal apparatus.

What is claimed is:

1. An electro-optical device comprising:
   a substrate;
   a first transistor;
   a second transistor adjacent to the first transistor in a first direction;
   a light shielding member provided along the first direction between the substrate and the first transistor and between the substrate and the second transistor;
   a capacitance wiring;
   a pixel electrode provided corresponding to the first transistor;
   a first conductive member including a first overlapping portion overlapping the light shielding member in a plan view and a first protrusion portion protruding from the first overlapping portion toward the pixel electrode in the plan view, the first conductive member being configured to electrically couple the first transistor and the pixel electrode;
   a capacitance element provided between the substrate and the light shielding member and overlapping the second transistor in the plan view; and
   a second conductive member including a second overlapping portion overlapping the light shielding member in the plan view and a second protrusion portion protruding from the second overlapping portion toward the pixel electrode in the plan view, the second conductive member being configured to electrically couple the capacitance element and the capacitance wiring, wherein
   a first contact hole configured to electrically couple the pixel electrode and the first conductive member overlaps a second contact hole configured to electrically couple the capacitance element and the second conductive member in the plan view.

2. The electro-optical device according to claim 1, wherein
   the first conductive member and the capacitance wiring are provided at a same layer.

3. The electro-optical device according to claim 1, wherein
   an area of the first protrusion portion is equal to or larger than an area of the second protrusion portion in the plan view.

4. The electro-optical device according to claim 1, wherein
   the first conductive member includes a layer containing aluminum, and
   the second conductive member includes a layer containing the polysilicon and a layer containing tungsten silicide.

5. The electro-optical device according to claim 1, wherein
   a length of a long side, on a side close to the pixel electrode, of the first contact hole is equal to or larger than a length of a long side, on a side close to the first protrusion portion, of the first contact hole.

6. The electro-optical device according to claim 1, wherein
a portion of the capacitance element is provided inside a groove provided at the substrate.

7. An electro-optical device comprising:
a substrate;
a transistor;
a light shielding member provided along a first direction between the substrate and the transistor;
a capacitance wiring;
a pixel electrode provided corresponding to the transistor;
a first conductive member including a first overlapping portion overlapping the light shielding member in a plan view and a first protrusion portion protruding from the first overlapping portion toward the pixel electrode in the plan view, the first conductive member being configured to electrically couple the transistor and the pixel electrode;
a capacitance element provided between the substrate and the light shielding member; and
a second conductive member including a second overlapping portion overlapping the light shielding member in the plan view and a second protrusion portion protruding from the second overlapping portion toward the pixel electrode in the plan view, the second conductive member being configured to electrically couple the capacitance element and the capacitance wiring, wherein
a first contact hole configured to electrically couple the pixel electrode and the first conductive member overlaps a second contact hole configured to electrically couple the capacitance element and the second conductive member.

8. A display apparatus comprising the electro-optical device described in claim 1.

* * * * *